(12) United States Patent
Lee et al.

(10) Patent No.: US 10,120,224 B2
(45) Date of Patent: Nov. 6, 2018

(54) CURVED COVER FOR CURVED DISPLAY AND CURVED TYPE DISPLAY APPARATUS INCLUDING THE SAME

(71) Applicant: LG DISPLAY CO., LTD., Seoul (KR)

(72) Inventors: Myoung Soo Lee, Paju-si (KR); Chang Hoon Song, Paju-si (KR); Min Roh, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/424,212

(22) Filed: Feb. 3, 2017

(65) Prior Publication Data

US 2017/0146850 A1  May 25, 2017

Related U.S. Application Data

(62) Division of application No. 14/810,818, filed on Jul. 28, 2015, now Pat. No. 9,817,261.

(30) Foreign Application Priority Data

Apr. 28, 2015 (KR) .................. 10-2015-0060049
Apr. 28, 2015 (KR) .................. 10-2015-0060062

(51) Int. Cl.
*G02F 1/1333* (2006.01)
*G06F 1/16* (2006.01)

(52) U.S. Cl.
CPC .......... *G02F 1/133308* (2013.01); *G06F 1/16* (2013.01); *H05K 999/99* (2013.01); *G02F 2001/13332* (2013.01); *G02F 2001/133322* (2013.01)

(58) Field of Classification Search
CPC ..... G02F 1/133308; G02F 2001/13332; G02F 2001/133322; G06F 1/1615; G06F 1/16; G06F 1/162; G06F 1/1618; G06F 1/1601
USPC ...... 349/58–60; 361/679.01, 679.02, 679.05, 361/679.06, 679.07, 679.21, 679.22, 361/679.29, 679.55, 679.6, 679.61
See application file for complete search history.

(56) References Cited

U.S. PATENT DOCUMENTS

| 6,734,928 B2 * | 5/2004 | Ito ..................... G02F 1/133308 349/58 |
| 2007/0103854 A1 * | 5/2007 | Yu ......................... G06F 1/1601 361/679.22 |
| 2009/0096957 A1 * | 4/2009 | Hiyama ................ G02B 6/003 349/65 |
| 2011/0261283 A1 * | 10/2011 | Kim ...................... G03B 17/02 349/58 |
| 2011/0310545 A1 * | 12/2011 | Liu .................. G02F 1/133308 361/679.01 |
| 2012/0242925 A1 * | 9/2012 | Watanabe ......... G02F 1/133308 349/58 |
| 2013/0321740 A1 * | 12/2013 | An ....................... H05K 5/0217 349/58 |

(Continued)

*Primary Examiner* — Steven T Sawyer
*Assistant Examiner* — Sagar Shrestha
(74) *Attorney, Agent, or Firm* — Dentons US LLP

(57) ABSTRACT

Disclosed are a curved cover for curved display and a curved type display apparatus including the same in which the curved type display apparatus includes a curved part that includes a front part covering one edge of a display panel having a curved shape, and the front part includes a curved part having a curved shape and a bending part provided at each of both edges of the curved part.

11 Claims, 16 Drawing Sheets

(56) References Cited

U.S. PATENT DOCUMENTS

| | | | | |
|---|---|---|---|---|
| 2014/0133073 A1* | 5/2014 | Ahn | ................ | H01L 51/5237 |
| | | | | 361/679.01 |
| 2014/0176852 A1* | 6/2014 | Ha | ................ | G02F 1/133308 |
| | | | | 349/58 |
| 2015/0177548 A1* | 6/2015 | Jeon | ............... | G02F 1/133308 |
| | | | | 349/12 |
| 2015/0192822 A1* | 7/2015 | Katou | ............ | G02F 1/133308 |
| | | | | 349/58 |
| 2015/0277131 A1* | 10/2015 | Park | ............... | G02B 27/2221 |
| | | | | 349/58 |
| 2015/0316810 A1* | 11/2015 | Shibahara | ......... | G02F 1/1333 |
| | | | | 349/150 |
| 2016/0037655 A1* | 2/2016 | Im | .................... | G02B 5/3033 |
| | | | | 359/483.01 |
| 2016/0095205 A1* | 3/2016 | Cho | ............... | G02F 1/133308 |
| | | | | 361/749 |

\* cited by examiner

CURVED COVER FOR CURVED DISPLAY AND CURVED TYPE DISPLAY APPARATUS INCLUDING THE SAME

CROSS-REFERENCE TO RELATED APPLICATIONS

This application is a Divisional of application Ser. No. 14/810,818, filed on Jul. 28, 2015, which claims the benefit of Korean Patent Application Nos. 10-2015-0060049 filed on Apr. 28, 2015 and 10-2015-0060062 filed on Apr. 28, 2015, which are hereby incorporated by reference for all purposes as if fully set forth herein.

BACKGROUND

Field of the Invention

The present invention relates to a display apparatus and a manufacturing method thereof, and more particularly, to a curved type display apparatus.

Discussion of the Related Art

With the advancement of information-oriented society, various requirements for display apparatuses for displaying an image are increasing. Recently, as a screen of a display apparatus has a flat form and enlarges in size, a deviation of a viewing distance to a screen center area and a viewing distance to each of both side areas of a screen increases. In order to reduce the deviation of the viewing distances and maximize a degree of viewing immersion of a user (or a viewer), a display apparatus where a flat screen is curved at a certain curvature has been proposed.

FIG. 1 is a diagram schematically illustrating a related art curved type display apparatus.

Referring to FIG. 1, the related art curved type display apparatus includes a display panel 10 that is concavely curved, an accommodating case (not shown) that accommodates the display panel 10 in a curved form, and a top case 20 that surrounds a side surface of the accommodating case and a front edge of the display panel 10 except a display surface of the display panel 10.

The top case 20 is provided in a tetragonal belt shape having an opening to cover the front edge of the display panel 10, thereby maintaining a curved shape of the display panel 10. Particularly, the top case 20 covers a panel driving circuit (not shown) that includes a pad part disposed at one edge of the display panel 10 and a plurality of flexible circuit films attached to the pad part.

In the related art curved type display apparatus, bezel widths BW1 and BW2 (or a width of a border) increase due to the top case 20, and for this reason, a degree of viewing immersion of a user in a curved screen may be reduced. Also, an aesthetic appearance of the related art curved type display apparatus may deteriorate due to the increases in a bezel width and a step height between the display panel 10 and the top case 20.

SUMMARY

Accordingly, the present invention is directed to a display apparatus and method for manufacturing the same that substantially obviates one or more problems due to limitations and disadvantages of the related art.

An aspect of the present invention is directed to provide a curved type display apparatus which has a thin bezel width and an enhanced aesthetic appearance.

Another aspect of the present invention is directed to provide a curved cover for curved display and a curved type display apparatus including the same, which prevent an aesthetic appearance from being deteriorated due to partial detachment caused by restoration of the shape of a display panel having a curved shape.

Another aspect of the present invention is directed to provide a curved type display apparatus which prevents an aesthetic appearance from being deteriorated due to partial detachment caused by restoration of the shape of a display panel having a curved shape.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a curved type display apparatus including a curved part that includes a front part covering one edge of a display panel, wherein the front part includes a curved part having a curved shape and a bending part provided at each of both edges of the curved part.

In another aspect of the present invention, there is provided a curved type display apparatus including a curved part that includes a front part covering one edge of a display panel having a curved shape, wherein the front part includes a middle part having a curved shape having a first curvature, one edge having a curved shape having a second curvature different from the first curvature, and another edge having a curved shape having the second curvature.

In another aspect of the present invention, there is provided a curved cover for curved display including a front part configured to cover a pad part of a display panel having a curved shape and a side wall part bent from the front part, wherein the front part includes a curved part having a curved shape and a bending part provided at each of both edges of the curved part.

In another aspect of the present invention, there is provided a curved type display apparatus in which a rear edge of a display panel having a curved shape is attached to a guide frame by a panel coupling member, and a supporting pad that supports a middle part between corners of the display panel overlaps the panel coupling member.

In another aspect of the present invention, there is provided a curved type display apparatus further includes a panel driving circuit coupled to a display panel and a curved cover covering the panel driving circuit. Here, a front part of the curved cover includes a curved part having a curved shape and a bending part provided at each of both edges of the curved part, the bending part having a curvature different from a curvature of the curved part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Figure 1:
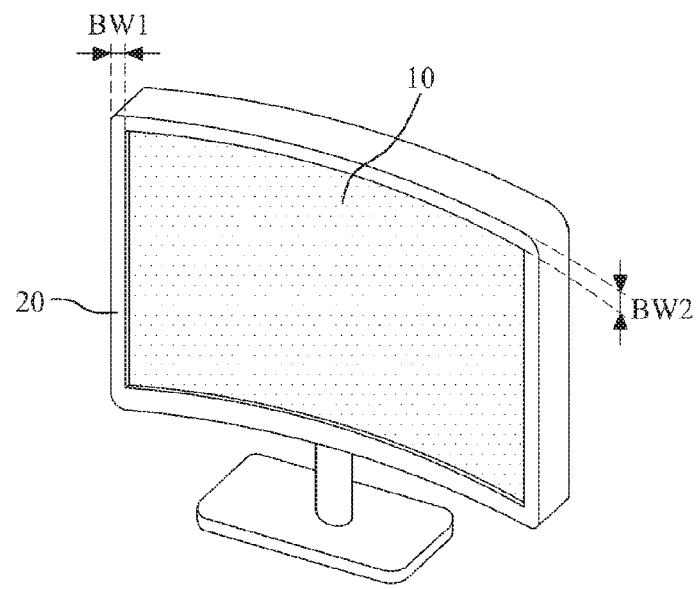
FIG. 1 is a diagram schematically illustrating a related art curved type display apparatus.

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of a curved cover for curved display and a curved type display apparatus including the same according to the present invention will be described in detail with reference to the accompanying drawings. In adding reference numerals for elements in each drawing, it should be noted that like reference numerals already used to denote like elements in other drawings are used for elements wherever possible. In the following description, when the detailed description of the relevant known function or configuration is determined to unnecessarily obscure the disclosure of the present invention, the detailed description will be omitted.

Figure 2:
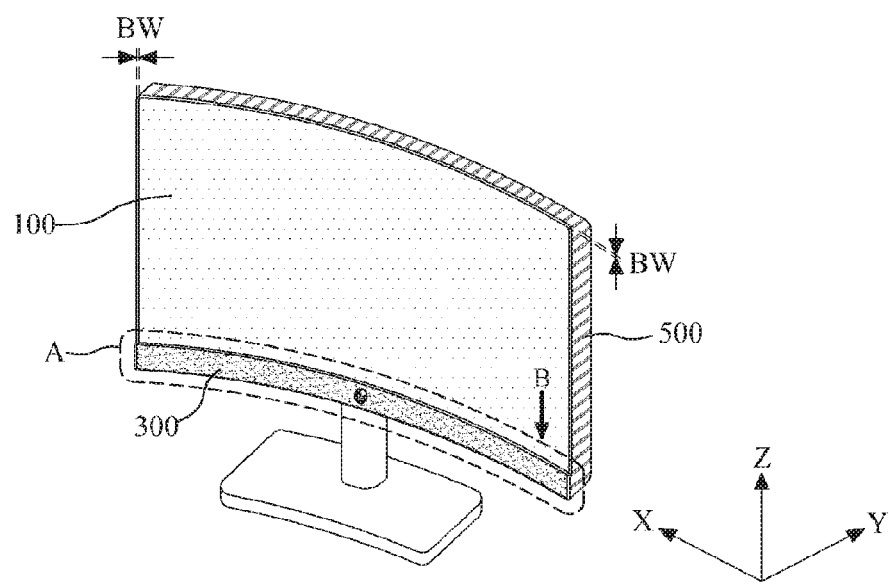
FIG. 2 is a diagram schematically illustrating a curved type display apparatus according to a first embodiment of the present invention.
Figure 3:
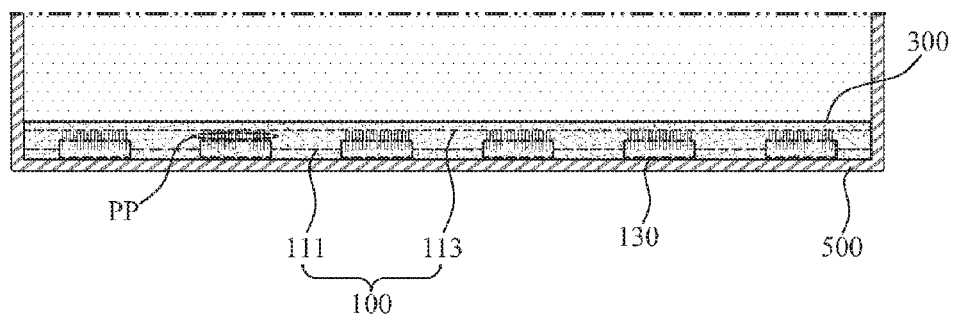
FIG. 3 is an enlarged view of a portion A of FIG. 2.

FIG. 2 is a diagram schematically illustrating a curved type display apparatus according to a first embodiment of the present invention, and FIG. 3 is an enlarged view of a portion A of FIG. 2.

Referring to FIGS. 2 and 3, the curved type display apparatus according to the first embodiment of the present invention may include a display panel 100, a curved cover 300, and an external case 500.

The display panel 100 may include a plurality of pixels which are respectively provided in a plurality of pixel areas defined by intersections of a plurality of gate lines and a plurality of data lines to display an image, a lower substrate 111, and an upper substrate 113.

The lower substrate 111 may have a larger size than that of the upper substrate 113. In this case, a portion other than one edge of the lower substrate 111 may have the same size as that of the upper substrate 113. The one edge of the lower substrate 111 may extend to outside one side surface of the upper substrate 113 not to overlap the upper substrate 113. A pad part PP connected to a pixel may be provided at the one edge of the lower substrate 111.

The pad part PP may be connected to a panel driving circuit 130. The panel driving circuit 130 may include a flexible circuit film that is connected to the pad part PP and is bent a rear surface of the display panel 100 along one side surface of the display panel 100, a driving integrated circuit (IC) that is mounted on the flexible circuit film, and a printed circuit board (PCB) that is disposed on the rear surface of the display panel 100.

The upper substrate 113 may be facing-bonded to the lower substrate 111 by a sealant to cover a portion of the lower substrate 111 except one edge of the lower substrate 111.

The display panel 100 may have a predetermined curvature or a predetermined radius with respect to a virtual reference point and may be curved in a concave shape. That is, the display panel 100 may be concavely bent in a curved shape by heating the display panel 100 at a predetermined temperature, and then, the display panel 100 may be curved a concave shape by a panel bending process of maintaining a bending state for a predetermined time and may be supported by a panel supporting part (not shown). Here, the panel supporting part may surround a side surface and the rear surface of the display panel 100 except a front surface of the display panel 100 and may include a guide frame (not shown) that supports the display panel 100. That is, the panel supporting part may not protrude onto the front surface of the display panel 100 and thus may expose the whole front surface of the display panel 100 to the front (or the outside) of the display apparatus.

The curved cover 300 may be manufactured to have a curved shape corresponding to that of the display panel 100 and may be disposed to cover the one edge of the display panel 100 including one edge of the lower substrate 111. The curved cover 300 may cover the pad part PP of the lower substrate 111 and the panel driving circuit 130 connected to the pad part PP by covering the one edge of the display panel 100.

Figure 4:
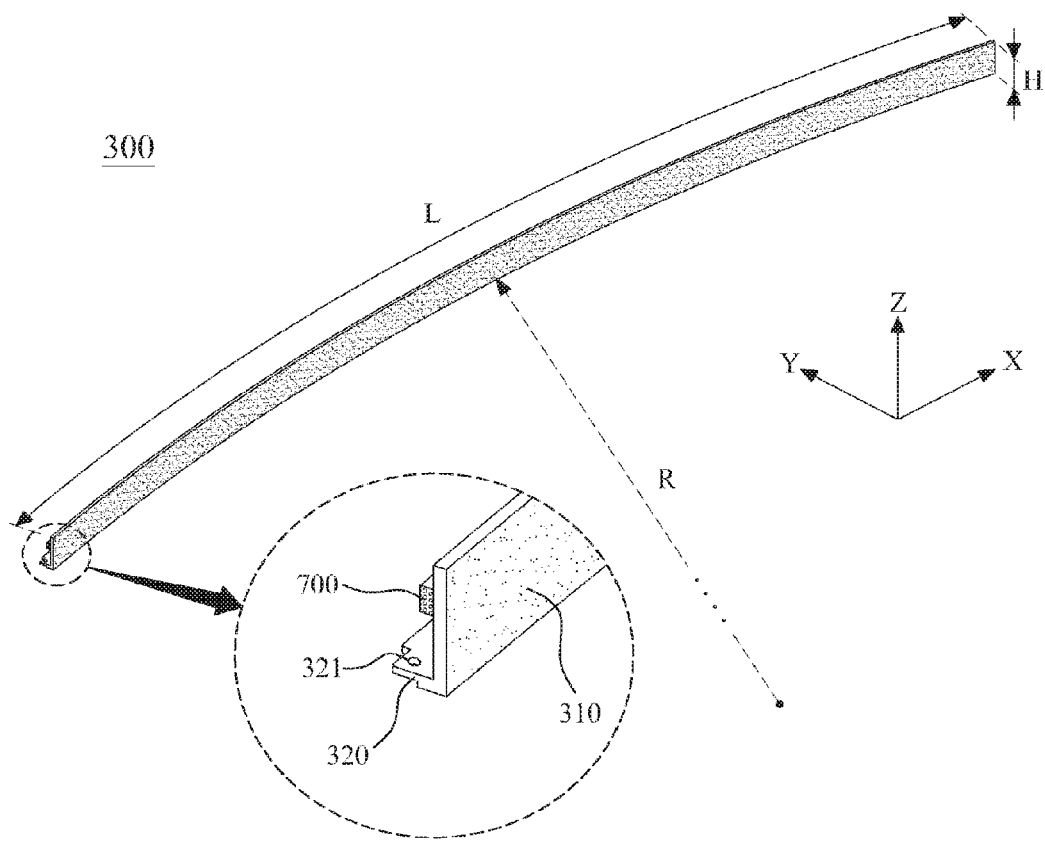
FIG. 4 is a diagram for describing a curved cover according to a first embodiment of the present invention illustrated in FIG. 2.

The curved cover 300 according to a first embodiment, as illustrated in FIG. 4, may include a front part 310 and a side wall part 320.

The front part 310 may cover the pad part PP of the display panel 100 and may be concavely curved to have a curved shape corresponding to that of the display panel 100. The front part 310 may have a length L and a height (or a width) H for covering the one edge of the display panel 100. The front part 310 may be disposed to be separated from a front surface (for example, a front surface of an upper polarizing member) of the one edge of the display panel 100 by a certain distance and may cover the front surface of the one edge of the display panel 100. That is, the front part 310 may have a curved shape having a predetermined curvature or a predetermined radius R with respect to the virtual reference point to be separated from the front surface of the display panel 100 by a certain distance.

The side wall part 320 may be bent from a lower side of the front part 310 to surround one side surface of the panel supporting part and one side surface of the display panel 100. The side wall part 320 may be detachably coupled to a side surface of the panel supporting part by a fastening ember such as a screw, a hook, and/or the like. For example, both edges (i.e., one edge and the other edge) of the side wall part 320 may be coupled to the side surface of the panel supporting part by a screw (not shown), and to this end, a screw through hole 321 may be provided in each of the both edges of the side wall part 320. Also, a portion other than the both edges of the side wall part 320 may be coupled to the side surface of the panel supporting part through a plurality of hooks (not shown) which are arranged at certain intervals.

The curved type display apparatus according to the first embodiment of the present invention may further include a buffering pad 700 that is provided between the one edge of the display panel 100 and the curved cover 300.

The buffering pad 700 may be attached to an inner surface (i.e., an inner surface of the front part 310) of the curved cover 300 facing the one edge of the display panel 100. In this case, the buffering pad 700 may have a straight shape having a certain width and thickness. Therefore, since the buffering pad 700 is disposed between the one edge of the display panel 100 and the front part 310 of the curved cover 300, the buffering pad 700 may buffer an external force applied to the curved cover 300 to protect the display panel 100 from the external force, and prevents foreign materials, such as dust and/or the like, from penetrating into between the display panel 100 and the curved cover 300 or minimizes the foreign materials.

Referring again to FIGS. 2 and 3, the external case 500 may accommodate the panel supporting part and surround a side surface of the panel supporting part and a side surface of the curved cover 300. The external case 500 according to an embodiment may include a case side wall and a floor plate for providing an accommodating space.

The floor plate may cover a rear surface of the panel supporting part. Particularly, the floor plate may have a curved shape corresponding to that of the display panel 100 so as to maintain the shape of the display panel 100 which is curved in a concave shape.

The case side wall may be provided vertical to the floor plate and may surround each of side surfaces of the panel supporting part and a side wall 320 of the curved cover 300.

In the curved type display apparatus according to the first embodiment of the present invention, edges other than the one edge of the display panel 100 are exposed to the outside without being covered by instruments such as the panel supporting part and the external case 500, and thus, the curved type display apparatus has a thin bezel width BW corresponding to a thickness of the external case 500. Also, a stepped portion is removed from an edge of the display panel 100, and thus, an aesthetic appearance of the curved type display apparatus is enhanced.

In the curved type display apparatus according to the first embodiment of the present invention, the partial detachment of the display panel 100 can occur due to a shape-restoring phenomenon that occurs in the display panel 100 having a curved shape depending on the elapse of time and an ambient environment condition (for example, a temperature and humidity). Particularly, when the display panel 100 is used as a screen of a monitor of a computer, the partial detachment of the edge of the display panel 100 can occur due to the shape-restoring phenomenon that occurs after the display panel 100 is supported by the panel supporting part in a state of being curved in a concave shape by the panel bending process. The partial detachment of the display panel 100 can occur in a small and medium display panel having a relatively smaller size than that of a large display panel which has a curved shape obtained by a self-weight without the panel bending process.

Figure 5:
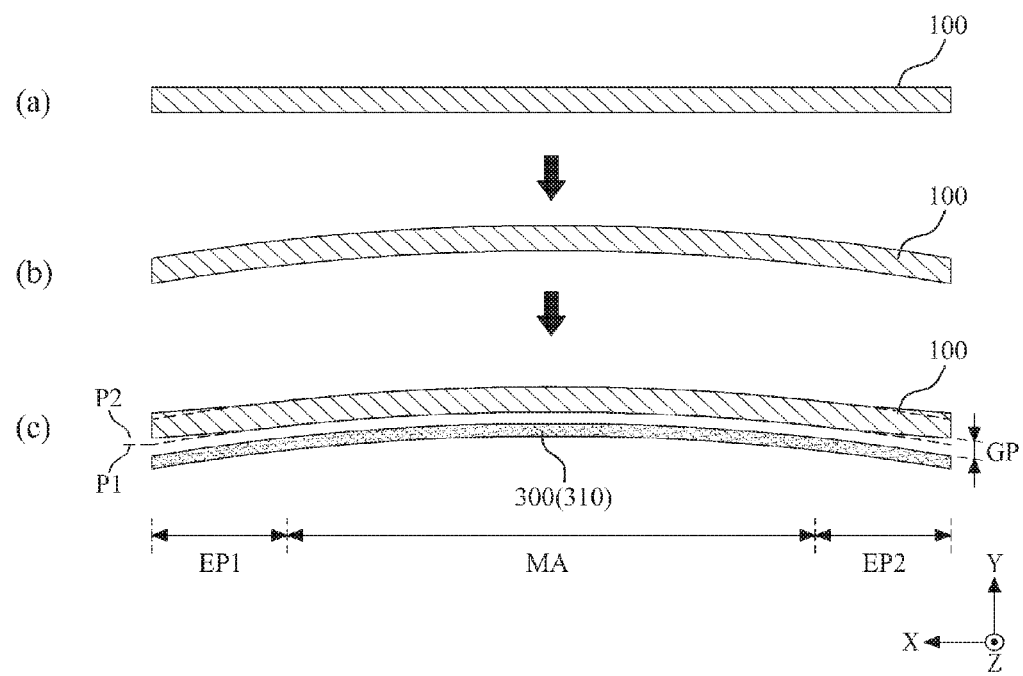
FIG. 5 is a diagram for describing non-uniformity of a gap caused by the release of the shape of a display panel illustrated in FIG. 2.

In detail, as illustrated in (a) to (c) of FIG. 5, the display panel 100 having a flat shape may be curved in a concave shape by the panel bending process and may be coupled to the panel supporting part in a curved shape. However, the display panel 100 which is coupled to the panel supporting part in a state of being curved in a curved shape may be locally modified due to a shape-releasing phenomenon which occurs depending on the elapse of time and an ambient environment condition. The partial detachment of the display panel 100 caused by the local modification of the display panel 100 causes non-uniformity of a gap (or a distance) GP provided between the display panel 100 and the curved cover 300, and for this reason, an aesthetic appearance of the curved type display apparatus is deteriorated. Here, the release of the shape of the display panel 100 can occur due to a deviation of a force which allows a concavely curved display panel 100 to return to a flat shape.

For example, when the display panel 100 is curved so that a horizontal length is longer than a vertical length and a horizontal-direction center part X is concave, left and right edge parts LEP and REP of the display panel 100 (or a short-edge of the display panel 100) may be modified from a reference position P1 to a shape-releasing position P2 due to the release of the shape of the display panel 100. Therefore, the gap GP provided between the display panel 100 and the curved cover 300 relatively more increases at each of first and second edge parts EP1 and EP2 of the display panel 100 than a middle area MA of the display panel 100, and thus, gaps GP provided in the middle area MA and the first and second edge parts EP1 and EP2 of the display panel 100 are non-uniform. For this reason, the gap GP between the display panel 100 and the curved cover 300 is non-uniform due to the release of the shape of the display panel 100, and thus, an aesthetic appearance of the curved type display apparatus is deteriorated, and foreign materials such as dust and/or the like can penetrate into the panel driving circuit 130 through the non-uniform gap GP.

Figure 6:
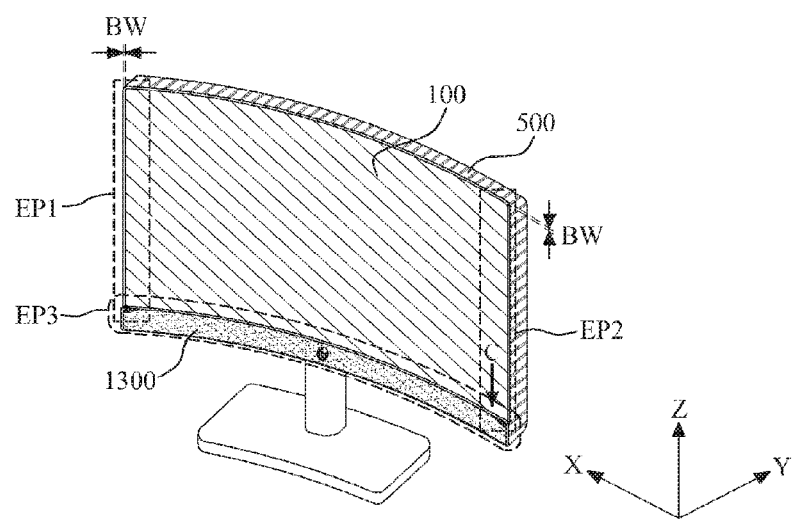
FIG. 6 is a diagram schematically illustrating a curved type display apparatus according to a second embodiment of the present invention.
Figure 7:
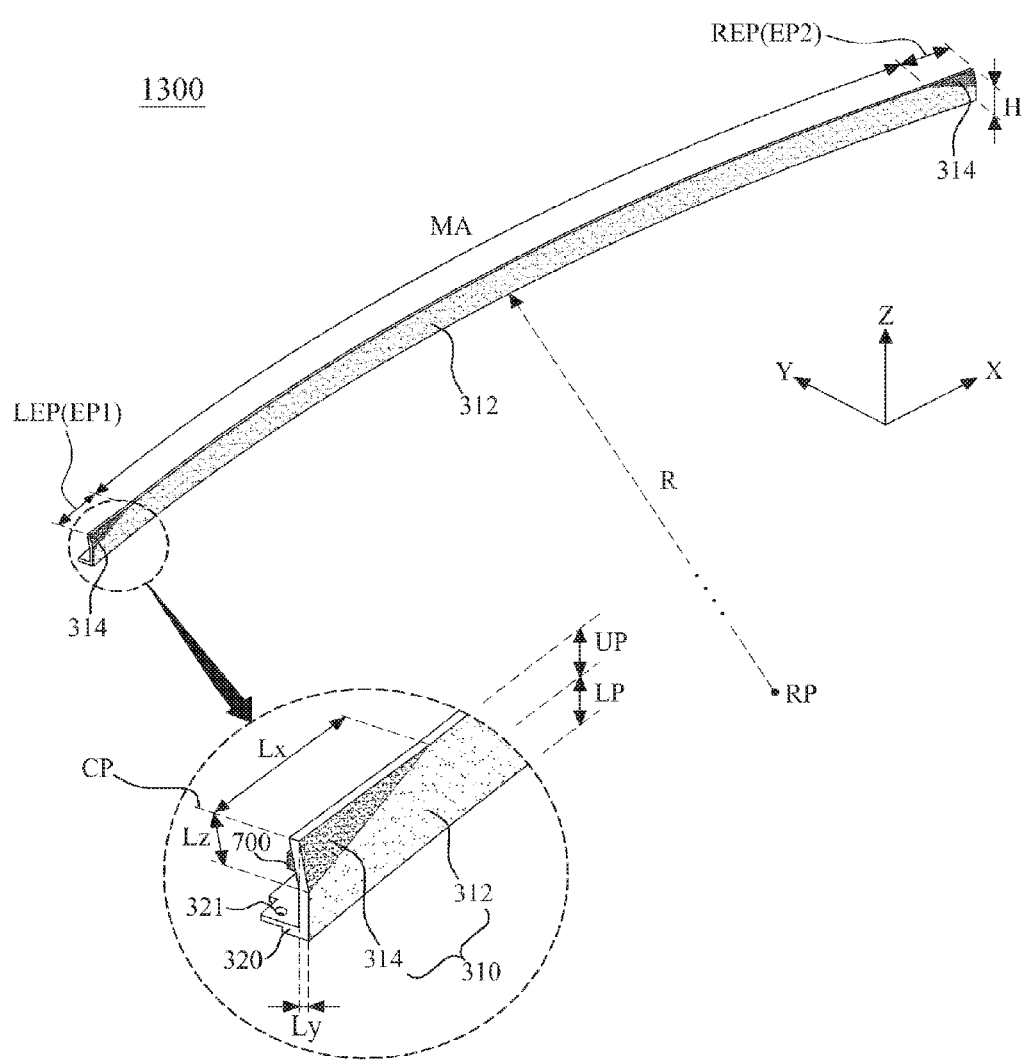
FIG. 7 is a diagram for describing a curved cover according to a second embodiment of the present invention.

FIG. 6 is a diagram schematically illustrating a curved type display apparatus according to a second embodiment of the present invention, and FIG. 7 is a diagram for describing a curved cover 1300 according to a second embodiment of the present invention. FIGS. 6 and 7 illustrate the curved type display apparatus and the curved cover manufactured by changing a structure of the front surface of the curved cover according to the first embodiment illustrated in FIG. 4. Thus, in the following description, only the curved cover will be described.

Referring to FIGS. 6 and 7, the curved cover 1300 according to the second embodiment of the present invention may include a front part 310 and a side wall part 320.

The front part 310 may cover a pad part of a display panel 100 (in more detail, one edge of the display panel 100) and may be separated from the one edge of the display panel 100 at non-uniform intervals. To this end, the front part 310 may include a middle area MA including a curved shape having a first curvature, one edge part LEP including a curved shape having a second curvature different from the first curvature, and the other edge part REP including a curved shape having the second curvature. Therefore, even when the shape of the display panel 100 is released, the front part 310 may be separated from the concavely curved display panel 100 at uniform intervals. The front part 310 according to an embodiment may include a curved part 312 and a bending part 314.

The curved part 312 may include a middle area MA of the front part 310 and may be concavely curved to have a curved shape corresponding to that of the display panel 100. The curved part 312 may have a length and a height (or a width) H for covering the one edge of the display panel 100. The curved part 312 may be disposed to be separated from the one edge (for example, a front surface of an upper polarizing member) of the display panel 100 by a certain distance and may cover a front surface of the one edge of the display panel 100. For example, the curved part 312 may cover a front surface of a third edge part EP3 of the display panel 100. The curved part 312 may have a curved shape having a predetermined curvature or a predetermined radius R with respect to a virtual reference point RP to be separated from a front surface of the display panel 100 by a certain distance.

The bending part 314 may include one edge part LEP and the other edge part REP of the front part 310 covering the third edge part EP3 of the display panel 100. The bending part 314 may be bent in a direction from a front surface of the curved part 312 to a front surface of the display panel 100 at each of one edge part LEP and the other edge part REP of the curved part 312, and thus, the one edge part LEP and the other edge part REP of the front part 310 maintain a uniform interval with the display panel 100.

In more detail, the bending part 314 may be provided at each of corner parts of both edges of the curved part 312 to have a curvature different from that of the curved part 312. For example, the bending part 314 may be bent toward the display panel 100 at each of the corner parts of the both edges of the curved part 312 and thus is more easily bent, whereby the bending part 314 may have a larger curvature than that of the curved part 312. Therefore, an upper part UP of the front part 310 may include the curved part 312, which is provided in the middle area MA between the one edge part LEP and the other edge part REP to have the first curvature, and the bending part 314 which is provided between the both edge parts LEP and REP to have the second curvature which is larger than the first curvature, with respect to a height direction Z of the curved cover 1300. Also, a lower part LP of the front part 310 may include only the curved part 312 having the first curvature, with respect to the height direction Z of the curved cover 1300.

The bending part 314 may be provided in a triangular shape at each of the corner parts of the both edges LEP and REP of the curved part 312 and thus is more easily bent. For example, the bending part 314 may have an isosceles triangle shape that includes a bottom side, which has a first length Lx and is parallel to a lengthwise direction X of the curved part 312 with a corner part CP (or an upper corner of a short side of the curved cover) of the curved part 312 as a reference point, and a height which has a second length Lz and is parallel to a height direction Z of the curved part 312 with the corner part CP of the curved part 312 as a reference point. Here, the first length Lx may be set to 10 mm to 20 mm, but is not limited thereto. For example, the first length Lx may be changed based on a size and/or a curvature of the display panel 100. Also, the second length Lz may be set to 4 mm to 8 mm, but is not limited thereto. For example, the second length Lz may be changed based on the size and/or curvature of the display panel 100.

The bending part 314 may be bent by a third length Ly in a direction from the front surface of the curved part 312 to the display panel 100. That is, the corner part CP of the curved part 312 included in the bending part 314 may be stepped by the third length Ly from the front surface of the curved part 312. For example, the third length Ly may be set to a thickness of the front part 310, or may be set to a reference distance (or a reference gap) between the display panel 100 and the front part 310.

The side wall part 320 may be bent from a lower side of the front part 310 to surround one side surface of a panel supporting part (not shown), thereby covering a flexible circuit film that is bent from the pad part of the display panel 100 to surround one side surface of the display panel 100. Since the side wall part 320 is the same as the side wall part of FIG. 4, like reference numerals refer to like elements, and descriptions on the same elements are not repeated.

Figure 8:
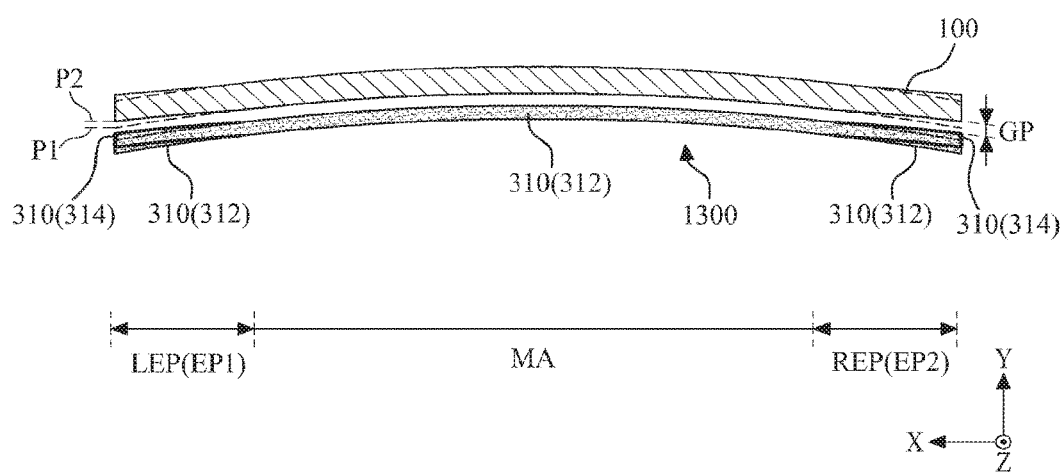
FIG. 8 is a plan view for describing a gap between a display panel and the curved cover illustrated in FIG. 7.

FIG. 8 is a plan view illustrating an arrangement structure of the display panel and the curved cover in the curved type display apparatus according to the second embodiment of the present invention.

Referring to FIGS. 6 to 8, the left and right edge parts LEP and REP of the display panel 100 which is curved in a concave shape may be modified from the reference position P1 to the shape-releasing position P2 due to the shape-releasing phenomenon caused by the elapse of time and an ambient environment condition (for example, a temperature and humidity). In this case, the left and right edge parts LEP and REP of the display panel 100 may be covered by the bending part 314 which is provided at the front part 310 of the curved cover 1300, and thus, gaps GP between the curved cover 1300 and the left and right edge parts LEP and REP of the display panel 100 and a gap GP between the curved cover 1300 and the middle area MA of the display panel 100 are identically maintained.

In detail, the middle area MA of the display panel 100 where the shape-releasing phenomenon is relatively small may be covered by the curved part 312 of the front part 310 having a curved shape corresponding to that of the display panel 100, and thus, even when the shape-releasing phenomenon occurs in the display panel 100, the predetermined gap GP between the middle area MA of the display panel 100 and the curved cover 1300 is maintained. Also, the both edges LEP and REP of the display panel 100 where the shape-releasing phenomenon is relatively large may be covered by the bending part 314 of the front part 310 which is bent to correspond to modification of a curvature caused by the release of the shape of the display panel 100, and thus, even when the shape-releasing phenomenon occurs in the display panel 100, the predetermined gaps GP between the both edges LEP and REP of the display panel 100 and the curved cover 1300 are maintained.

Therefore, since the curved cover 1300 according to the second embodiment of the present invention includes the bending part 314 which is bent to correspond to modification of a curvature caused by the release of the shape of the display panel 100, the curved cover 1300 is separated from the concavely curved display panel 100 at uniform intervals despite the release of the shape of the display panel 100.

Therefore, non-uniformity of the gap GP which occurs between the display panel 100 and the curved cover 1300 due to the release of the shape of the display panel 100 is minimized or prevented, and thus, an aesthetic appearance of the curved type display apparatus is enhanced, and foreign materials such as dust and/or the like are prevented from penetrating into the panel driving circuit through the non-uniform gap GP or are minimized.

Figure 9:
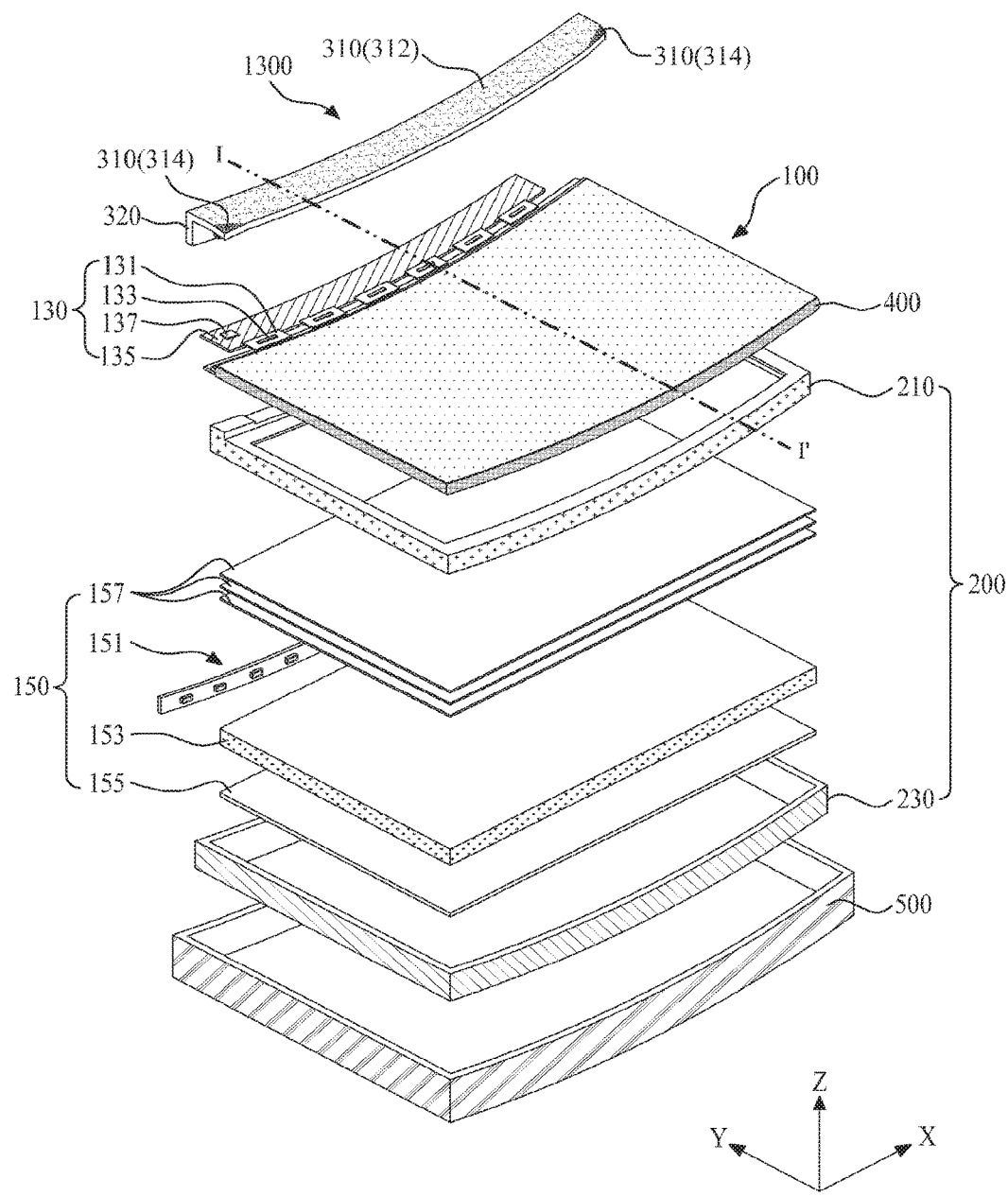
FIG. 9 is an exploded perspective view for describing in detail the curved type display apparatus according to the second embodiment of the present invention.
Figure 10:
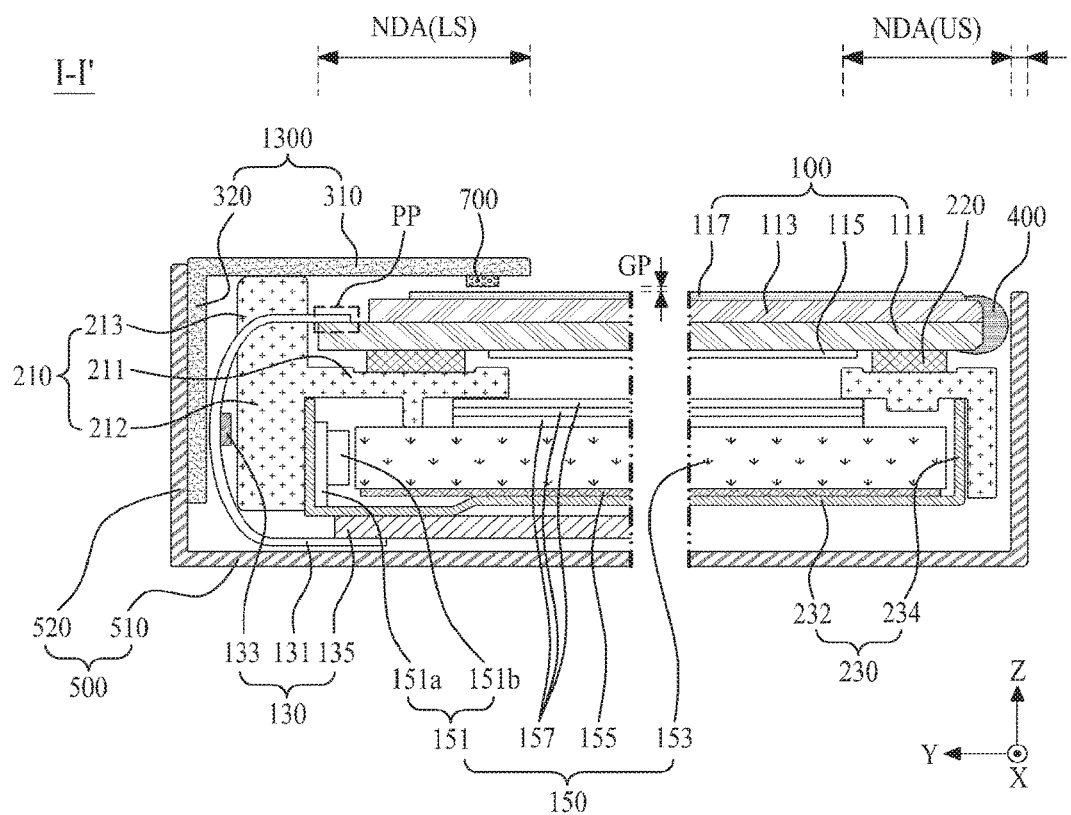
FIG. 10 is a cross-sectional view taken along line I-I' of FIG. 9.

FIG. 9 is an exploded perspective view for describing in detail the curved type display apparatus according to the second embodiment of the present invention, and FIG. 10 is a cross-sectional view taken along line I-I' of FIG. 9.

Referring to FIGS. 9 and 10, the curved type display apparatus according to the second embodiment of the present invention may include the display panel 100, a panel driving circuit 130, a backlight unit 150, a panel supporting part 200, the curved cover 1300, and an external case 500.

The display panel 100 may adjust a light transmittance of a liquid crystal layer (not shown) to display an image and include a lower substrate 111 and an upper substrate 113 which are facing-bonded to each other with the liquid crystal layer therebetween, a lower polarizing member 115, and an upper polarizing member 117.

The lower substrate 111 may be a thin film transistor (TFT) array substrate and may include a pixel array includ-ing a plurality of pixels (not shown) which are respectively provided in a plurality of pixel areas defined by intersections of a plurality of gate lines (not shown) and a plurality of data lines (not shown). Each of the plurality of pixels may include a TFT (not shown) connected to a gate line and a data line, a pixel electrode connected to the TFT, and a common electrode which is provided adjacent to the pixel electrode and receives a common voltage.

The pad part PP connected to a plurality of signal lines may be provided at one edge part LS of the lower substrate 111 and may be connected to the panel driving circuit 130. Also, a gate driving circuit (not shown) for supplying a gate (or scan) signal to the gate lines may be provided in a non-display area NDA of one short side or both short sides of the lower substrate 111. The gate driving circuit may be provided to be connected to the gate lines in a process of manufacturing the TFT of each of the plurality of pixels.

The upper substrate 113 may include a pixel defining pattern, which defines an opening area overlapping each of the plurality of pixel areas provided on the lower substrate 111, and a color filter that is provided in the opening area. The upper substrate 113 may be facing-bonded to the lower substrate 111 by a sealant with the liquid crystal layer therebetween.

An alignment layer (not shown) for adjusting a pretilt angle of liquid crystal may be disposed on at least one of the lower substrate 111 and the upper substrate 113. The liquid crystal layer may be disposed between the lower substrate 111 and the upper substrate 113 and may include the liquid crystal consisting of liquid crystal molecules which are aligned in a horizontal direction with a lateral electric field generated by a data voltage applied to the pixel electrode and the common voltage applied to the common electrode in each of the plurality of pixels.

The lower polarizing member 115 may be attached to a bottom of the lower substrate 111 and may polarize light incident from the backlight unit 150 with respect to a first polarizing axis to irradiate the polarized light onto the lower substrate 111.

The upper polarizing member 117 may be attached to a top of the upper substrate 113 to polarize light that passes through the upper substrate 113 and is transferred to the outside. The upper polarizing member 117 according to an embodiment may include a polarizing film that is attached to the top of the upper substrate 113 to polarize the light, which passes through the upper substrate 113 and is transferred to the outside, with respect to a second polarizing axis different from the first polarizing axis. The upper polarizing member 117 according to another embodiment may include the polarizing film and a retarder film (not shown) that is attached to the top of the polarizing film to separate a three-dimensional (3D) image (i.e., a left-eye image and a right-eye image), displayed by the display panel 100, into different polarization states When the upper polarizing member 117 includes the retarder film, the display panel 100 may be driven in a two-dimensional (2D) display mode and a 3D display mode. In the 3D display mode, a left-eye image (or a right-eye image) may be displayed on an odd-numbered (or even-numbered) horizontal line of the display panel 100, and simultaneously, the right-eye image (or the left-eye image) may be displayed on the even-numbered (or odd-numbered) horizontal line of the display panel 100. The retarder film may include a first retarder pattern, which overlaps the odd-numbered horizontal line and polarizes an image, displayed on the odd-numbered horizontal line, to a first polarization state, and a second retarder pattern which overlaps the even-numbered horizontal line and polarizes an image, displayed on the even-numbered horizontal line, to a second polarization state different from the first polarization state.

The display panel 100 may drive the liquid crystal layer with an electric field which is generated by the data voltage and the common voltage applied to each of the plurality of pixels, thereby displaying a certain color image according to a light transmittance of the liquid crystal layer.

In addition, the curved type display apparatus according to the second embodiment of the present invention may further include a side sealing member 400.

The side sealing member 400 may be provided to cover side surfaces of the display panel 100 except the one edge part LS of the display panel 100. For example, with respect to a vertically disposed display surface of the display panel 100, the side sealing member 400 may directly cover three side surfaces of the display panel 100 including a left surface, a left upper corner part, an upper surface, a right upper corner part, and a right surface except one side surface (i.e., a lower surface) of the display panel 100 where the pad part PP is provided. The side sealing member 400 protects the side surfaces of the display panel 100 from an external impact and prevents light from being leaked through the side surfaces of the display panel 100.

The side sealing member 400 may be formed of a silicon-based or UV hardening-based sealant (or resin), but considering a process tack time, the side sealing member 400 may be formed of a UV hardening-based sealant. Also, the side sealing member 400 may be colored (for example, blue, red, bluish green, or black), but is not limited thereto. In order to prevent light from being leaked through the side surfaces, the side sealing member 400 may be formed of a colored resin or a light blocking resin.

The panel driving circuit 130 may be connected to the pad part PP provided on the substrate 111 to drive the pixels of the display panel 100, thereby displaying a certain color image in the display panel 100. The panel driving circuit 130 according to an embodiment may include a plurality of flexible circuit films 131 connected to the pad part PP of the display panel 100, a data driving IC 133 mounted on each of the plurality of flexible circuit films 131, a PCB 135 coupled to each of the plurality of flexible circuit films 131, and a timing controller 137 mounted on the PCB 135.

Each of the plurality of flexible circuit films 131 may be attached between the pad part PP of the lower substrate 111 and the PCB 135 by a film attaching process and may be formed of a tape carrier package (TCP) or chip on film (COF, chip on flexible board). Each of the plurality of flexible circuit films 131 may be bent along one side surface (i.e., the lower surface) of the display panel 100 and may be disposed on a rear surface of the panel supporting part 200.

The data driving IC 133 may be mounted on each of the plurality of flexible circuit films 131 and may be connected to the pad part PP through the flexible circuit films 131. The data driving IC 133 may receive pixel data for each pixel and a data control signal which are supplied from the timing controller 137, convert the pixel data for each pixel into an analog data signal according to the data control signal, and supply the analog data signal to a corresponding data line.

The PCB 135 may be connected to the plurality of flexible circuit films 131. The PCB 135 may respectively supply signals, which are for displaying an image on each pixel of the display panel 100, to the data driving IC 133 and a gate driving circuit. To this end, various signal lines, various power circuits (not shown), a memory (not shown), etc. may be mounted on the PCB 1.35.

The timing controller 137 may be mounted on the PCB 135. The timing controller 137 may align digital image data input from a driving system according to a pixel arrangement structure of the display panel 100 to generate pixel data for each pixel in response to a timing sync signal supplied from an external driving system (not shown) and may supply the generated pixel data for each pixel to the data driving IC 133. Also, the timing controller 137 may generate a data control signal and a gate control signal based on the timing sync signal to control a driving timing of each of the data driving IC 133 and the gate driving circuit.

In addition, the timing controller 137 may control the backlight unit 150 by using an edge type local dimming technology to separately control a luminance of each of regions of the display panel 100.

As described above, the display panel 100 connected to the panel driving circuit 130 may be curved in a concave shape by the panel bending process and may maintain a concavely curved shape. That is, the display panel 100 which has undergone the panel bending process may have a curved shape instead of a flat shape. For example, the display panel 100 may a curved shape where a horizontal-direction (X) length is longer than a vertical-direction (Y) length and a horizontal-direction (X) center part is concavely curved toward the backlight unit 150.

The backlight unit 150 may be accommodated in the panel supporting part 200 to irradiate light onto a bottom of the display panel 100. The backlight unit 150 according to an embodiment may include a light source 151, a light guide panel 153, a reflective sheet 155, and an optical sheet part 157.

The light source 151 may irradiate light onto a light incident part which is provided on one side surface of the light guide panel 153. Here, the light incident part may include one long side of the light guide panel 153 overlapping the one edge part LS of the display panel 100, but is not limited thereto. For example, the light incident part may include both long sides or both short sides of the light guide panel 153. However, in the curved type display apparatus where the display surface of the display panel 100 is vertically disposed, in order to minimize bezel widths of an upper side US and left and right sides, the light incident part may be provided on one long side of the light guide panel 133 overlapping the one edge part LS of the display panel 100.

The light source 151 according to an embodiment may include a plurality of light emitting diode (LED) packages 151b that are mounted on a light source PCB 151a to emit white light according to a light source driving signal supplied from a backlight driver (not shown).

The plurality of LED packages 151b may be mounted on the light source PCB 151a to face the light incident part of the light guide panel 153 and to be arranged at predetermined intervals along a long-side length direction X of the light guide panel 153. In this case, an interval between adjacent LED packages 151b may be set to within a range where hot spot does not occur in the light incident part of the light guide panel 133 due to light emitted from adjacent LED packages 151b.

The light guide panel 153 may be disposed under the rear surface of the display panel 100 and may transfer the light, which is incident through the light incident part from the plurality of LED packages 151b, toward the rear surface of the display panel 100. The light guide panel 153 according to an embodiment may be manufactured in a flat shape and may be accommodated in the panel supporting part 200 to have a curved shape. That is, the flat-shaped light guide panel 153 may be concavely bent by a self-weight when the flat-shaped light guide panel 153 is accommodated in the panel supporting part 200, and thus, the light guide panel 153 may have a curved shape corresponding to that of the display panel 100. The light guide panel 153 according to another embodiment may be manufactured in a curved shape corresponding to that of the concavely curved display panel 100 and may be accommodated in the panel supporting part 200.

The reflective sheet 155 may be disposed on a bottom of the light guide panel 153 to reflect the light, which is incident from the light guide panel 153, toward the light guide panel 153, thereby minimizing the loss of the light traveling to a rear surface of the light guide panel 153.

The optical sheet part 157 may be disposed on the light guide panel 153 and may include a lower diffusive sheet, a prism sheet, and an upper diffusive sheet, but is not limited thereto. For example, the optical sheet part 157 may be configured by a stacked combination of two or more of a diffusive sheet, a prism sheet, a dual brightness enhancement film, and a lenticular sheet.

The panel supporting part 200 may support the display panel 100 and accommodate the backlight unit 150. The panel supporting part 200 according to an embodiment may include a guide frame 210, a panel coupling ember 220, and a supporting cover 230.

The guide frame 210 according to an embodiment may have a tetragonal frame shape and may be supported by the supporting cover 230 to support the display panel 100. In this case, one side part of the guide frame 210 may support the curved cover 1300 to surround one side surface of the display panel 100, and the other parts except the one side part of the guide frame 210 may be disposed under the display panel 100. In detail, the guide frame 210 according to an embodiment may include a panel coupling part 211, a guide side wall 212, and a protrusion side wall 213.

The panel coupling part 211 may be provided in a tetragonal belt shape having a central opening and may be disposed under the display panel 100 to support a rear edge of the display panel 100.

The guide side wall 212 may be provided at a rear edge of the panel coupling part 211 to have a certain height. The guide side wall 212 may be disposed under the display panel 100 to surround side surfaces of the supporting cover 230.

The protrusion side wall 213 may be provided to have a certain height at a top edge of the panel coupling part 211 overlapping the one edge part LS of the display panel 100. That is, the protrusion side wall 213 may be provided on one side of the panel coupling part 211 to surround a lower surface of the display panel 100 and support the curved cover 1300. The plurality of flexible circuit films 131 may be bent toward a rear surface of the supporting cover 230 to surround a top and a side surface of the protrusion side wall 213.

The guide frame 210 according to an embodiment may have a curved shape corresponding to that of the concavely curved display panel 100. That is, the guide frame 210 according to an embodiment may have a curved shape where a horizontal-direction (X) length is longer than a vertical-direction (Y) length and a horizontal-direction (X) center part is concavely curved toward the external case 500.

The panel coupling member 220 may physically couple the rear edge of the display panel 100 to the guide frame 210. That is, a bottom of the panel coupling member 220 may be physically coupled to the panel coupling part 211 of the guide frame 210, and a top of the panel coupling member 220 may be physically coupled to the rear edge of the display panel 100. The panel coupling member 220 may attach the display panel 100 to the guide frame 210, thereby maintaining a curved shape of the concavely curved display panel 100 and preventing the display panel 100 from being detached from the guide frame 210 and falling. In this case, the panel coupling member 220 may be coupled to the lower substrate 111 of the display panel 100 in consideration of a coupling force and thicknesses of the guide frame 210 and the display panel 100, but is not limited thereto. For example, the panel coupling member 220 may be coupled to the lower polarizing member 115 of the display panel 100. For example, the panel coupling member 220 may be a double-sided tape, a heat-hardening adhesive, a photocurable adhesive, a foam tape, or the like, but may be a double-sided tape or a foam tape having a certain elastic force for absorbing an impact.

The panel coupling member 220 may be applied for enhancing an aesthetic appearance and reducing a bezel width and the number of elements of the curved type display apparatus by removing a top case from the curved type display apparatus. That is, since the display panel 100 is fixed to the guide frame 210 by the panel coupling member 220, a top case of the related art for preventing the display panel 100 supported by the guide frame 210 from failing may be removed. Therefore, an embodiment of the present invention does not need the top case of the related art, and all surfaces other than one edge of the display panel 100 may have a flat shape and may be exposed to the outside, thereby reducing a bezel width and the number of elements of the curved type display apparatus. Also, since the top case of the related art is removed, a side surface of the display panel 100 is exposed to the outside, and for this reason, the display panel 100 can be damaged by an external impact, or light can be leaked through the side surface due to the total internal reflection of the display panel 100. On the other hand, according to the present embodiment, the side sealing member 400 provided on the side surface of the display panel 100 protects the side surface of the display panel 100 from an external impact and prevents light from being leaked through the side surface.

The supporting cover 230 may accommodate the backlight unit 150 and support the guide frame 210. The supporting cover 230 according to an embodiment may include a cover plate 232, which supports the backlight unit 150 and covers a rear surface of the backlight unit 150, and a cover side wall 234 that is bent from an edge of the cover plate 232 to provide an accommodating space in the cover plate 232 and support the panel coupling part 211 of the guide frame 210.

The cover side wall 234 of the supporting cover 230 may be surrounded by the guide side wall 212 of the guide frame 210 and may be coupled to the guide side wall 212 by a coupling means such as a hook or the like.

The supporting cover 230 may have a curved shape corresponding to that of the concavely curved display panel 100. That is, the supporting cover 230 may have a curved shape where a horizontal-direction (X) length is longer than a vertical-direction (Y) length and a horizontal-direction (X) center part is concavely curved toward the external case 500.

In addition, a horizontal reinforcement bar and/or a vertical reinforcement bar for reinforcing the rigidity of the curved type display apparatus may be further disposed on the rear surface of the supporting cover 230.

The curved cover 1300 may be manufactured to have a curved shape corresponding to that of the display panel 100 and may be coupled to the panel supporting part 200 to cover the one edge part PS of the display panel 100. Since the curved cover 1300 has the same structure as that of the curved cover of FIGS. 6 to 8, like reference numerals refer to like elements, and descriptions on the same elements are not repeated.

The curved cover 1300 may be detachably coupled to a side surface of the panel supporting part 200 (i.e., a side surface of the guide frame 210) by a fastening member such as a screw, a hook, and/or the like. Therefore, the front part 310 of the curved cover 1300 may cover the one edge part LS of the display panel 100 and the protrusion side wall 213 of the guide frame 210. Also, the side wall part 320 of the curved cover 1300 may surround one side of the guide frame 210, namely, a side surface of the protrusion side wall 213 and the guide side wall 212. Therefore, the curved cover 1300 may cover one edge of the display panel 100, the pad part PP, and the panel driving circuit 130 not to be exposed to the outside.

The curved cover 1300, as described above, may include the bending part 314 which is bent to correspond to modification of a curvature caused by the release of the shape of the display panel 100, and thus, the curved cover 1300 is separated from the concavely curved display panel 100 at uniform intervals despite the release of the shape of the display panel 100. That is, the gap GP provided between the display panel 100 and the curved cover 1300 is uniformly maintained by the bending part 314 of the curved part 312 provided in the front part 310 of the curved cover 1300 despite the release of the shape of the display panel 100.

The external case 500 may accommodate the panel supporting part 200 and surround a side surface of the panel supporting part 20 and a side surface of the curved cover 1300, thereby forming a side surface and an external appearance of the curved type display apparatus. The external case 500 according to an embodiment may include a case plate 510 and a case side wall 520 which provide an accommodating space.

The case plate 510 may cover the panel supporting part 200, namely, the rear surface of the supporting cover 230. Particularly, the case plate 510 may have a curved shape corresponding to that of the concavely curved display panel 100, for enhancing an aesthetic appearance of the rear surface of the curved type display apparatus. That is, the case plate 510 may have a curved shape where a horizontal-direction (X) length is longer than a vertical-direction (Y) length and a horizontal-direction (X) center part is concavely curved toward a rear portion.

The case side wall 520 may be bent vertical to an edge of the case plate 510 to surround a side surface of the panel supporting part 200 and the side wall part 320 of the curved cover 1300. That is, one side wall of the case side wall 520 may surround the side wall part 320 of the curved cover 1300, and the other side walls of the case side wall 520 may surround the other side surfaces of the guide frame 210, which are not surrounded by the curved cover 1300, and the side sealing member 400 provided on the side surface of the display panel 100. Therefore, the side surfaces of the display panel 100 may be surrounded by the case side wall 520, and a top of the one edge part LS of the display panel 100 may be covered by the curved cover 1300. Accordingly, the other top except the top of the one edge part LS of the display panel 100 may be exposed to the outside without being covered by a separate instrument.

Since all front surfaces of the display panel 100 other than the one edge part LS of the display panel 100 are exposed to the outside, the curved type display apparatus according to the second embodiment of the present invention has a thin bezel width W and an enhanced aesthetic appearance. Also, in the curved type display apparatus according to the second embodiment of the present invention, a uniform gap between the display panel 100 and the curved cover 1300 is provided by the bending part 314 provided in the front part 310 of the curved cover 1300 despite the release of the shape of the display panel 100, and thus, the deterioration of an aesthetic appearance caused by the release of the shape of the display panel 100 is minimized.

Figure 11:
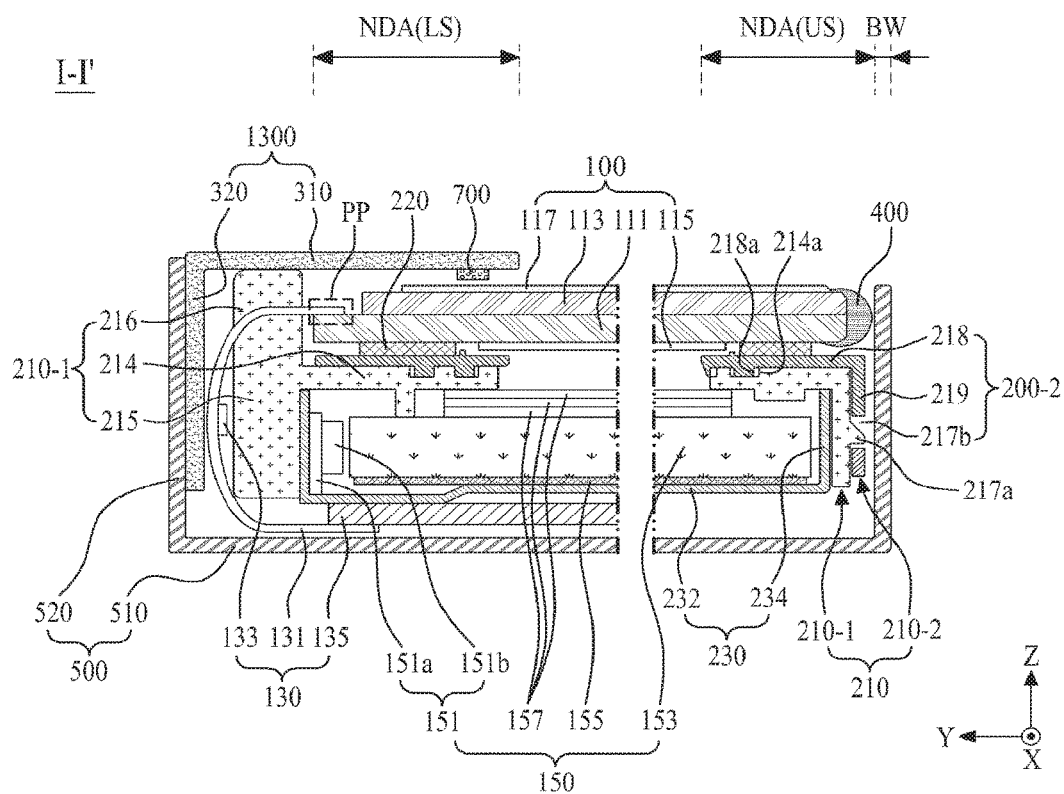
FIG. 11 is another cross-sectional view taken along line I-I' of FIG. 9 and is a diagram for manufacturing a guide frame according to a modification example.

FIG. 11 is another cross-sectional view taken along line I-I' of FIG. 9 and is a diagram illustrating a modified structure of the guide frame illustrated in FIG. 9. Thus, in the following description, only a structure of the guide frame will be described.

Referring to FIGS. 9 and 11, a guide frame 210 according to another embodiment may include a lower guide frame 210-1 and an upper guide frame 210-2.

The lower guide frame 210-1 may have a tetragonal frame shape and may be accommodated in the supporting cover 230 to support the upper guide frame 210-2. The lower guide frame 210-1 may include a frame supporting part 214, a lower guide side wall 215, a protrusion side wall 216, and a first coupling member 717a.

The frame supporting part 214 may be provided in a tetragonal belt shape having a central opening and may be disposed under the rear edge of the display panel 100 to support the upper guide frame 210-2.

The lower guide side wall 215 may be provided at a rear edge of the frame supporting part 214 to have a certain height. The lower guide side wall 215 may provide an accommodating space, which is disposed under the frame supporting part 214, for the backlight unit 150 and surround the side surfaces of the supporting cover 230.

The protrusion side wall 216 may be provided to have a certain height at a top edge of the frame supporting part 214 overlapping the one edge part LS of the display panel 100. That is, the protrusion side wall 216 may be provided on one side of the frame supporting part 214 to surround the lower surface of the display panel 100 and support the curved cover 1300. The plurality of flexible circuit films 131 may be bent toward the rear surface of the supporting cover 230 to surround a top and a side surface of the protrusion side wall 216.

The first coupling member 217a may be provided on the lower guide side wall 215 and may be coupled to the upper guide frame 210-2. In this case, a plurality of the first coupling members 217a may be provided at predetermined intervals on the other side walls except one side wall of the lower guide side wall 215 covered by the curved cover 1300. The first coupling member 217a according to an embodiment may be a coupling projection that protrudes in a direction from an outer surface of the lower guide side wall 215 to the case side wall 520 of the external case 500.

The lower guide frame 210-1 may have a curved shape corresponding to that of the concavely curved display panel 100. That is, the lower guide frame 210-1 may have a curved shape where a horizontal-direction (X) length is longer than a vertical-direction (Y) length and a horizontal-direction (X) center part is concavely curved toward the external case 500.

The upper guide frame 210-2 may have a flatly tetragonal belt shape and may be disposed on the lower guide frame 210-1 to support the display panel 100. The upper guide frame 210-2 according to an embodiment may include a panel coupling part 218, an upper guide side wall 219, and a second coupling member 217b.

The panel coupling part 218 may be provided in a tetragonal belt shape having a central opening and may be disposed in the frame supporting part 214 of the lower guide frame 210-1 to support the rear edge of the display panel 100. In this case, the panel coupling part 218 may be physically coupled to the rear edge of the display panel 100 by the panel coupling member 220. In addition, the panel coupling part 218 may further include a guide groove for enabling the panel coupling member 200 to be easily disposed. The guide groove may be concavely provided to have a certain depth from a top of the panel coupling part 218, thereby guiding an arrangement position of the panel coupling member 220.

A plurality of the upper guide side walls 219 may be respectively provided to have a certain height at edges other than one edge of the panel coupling part 218 overlapping one edge of the display panel 100. That is, the upper guide side walls 219 may be respectively provided to have a certain height at left, right, and upper edges of the panel coupling part 218 in parallel with the lower guide side wall 215 and thus may surround side walls other than one side wall of the lower guide side wall 215 of the lower guide frame 210-1.

The second coupling member 217b may be provided on the upper guide side wall 219 to be coupled to the first coupling b 217a. That is, the second coupling member 217b according to an embodiment may be a coupling hole that passes through the upper guide side wall 219 in order for the first coupling member 217a to be inserted.

The upper guide frame 210-2 may have a curved shape corresponding to that of the concavely curved display panel 100. That is, the upper guide frame 210-2 according to an embodiment may have a curved shape where a horizontal-direction (X) length is longer than a vertical-direction (Y) length and a horizontal-direction (X) center part is concavely curved toward the external case 500. The upper guide frame 210-2 may be coupled to the lower guide frame 210-1 by coupling between the first coupling member 217a and the second coupling member 217b to support the display panel 100.

In addition, in a state where a position of the upper guide frame 210-2 coupled to the display panel 100 by the panel coupling member 220 is fixed, when heat expansion occurs in the display panel 100 and/or the guide frame 210, light leakage can occur due to a change in the liquid crystal layer caused by modification of the display panel 100. It can be considered that the light leakage occurs because of maintaining a state here the display panel 100 is tightly fixed not to be moved. Therefore, the upper guide frame 210-2 may be disposed in the frame supporting part 214 of the lower guide frame 210-1 to be moved in a horizontal direction (X, Y) within a predetermined range. To this end, the guide frame 210 according to another embodiment may further include first and second movement guiders 214a and 218a.

The first movement guider 214a may be provided in the frame supporting part 214 of the lower guide frame 210-1. The first movement guider 214a according to an embodiment may be at least one guide groove which is provided to have a certain depth on a top of the frame supporting part 214.

The second movement guider 218a may be provided in the panel coupling part 218 of the upper guide frame 210-2 and may be movably disposed at the first movement guider 214a. The second movement guider 218a according to an embodiment may be at least one guide rail that is provided to have a certain height from a bottom of the panel coupling part 218.

In addition, the second coupling member 217b may have a greater height than that of the first coupling member 217a A size difference between the first and second coupling members 217a and 217b is for moving the display panel 100 within a certain range in a vertical direction Z (or a thickness direction of the display panel) vertical to a horizontal direction identically to the reason of moving the display panel 100 in the horizontal direction.

The guide frame 210 according to another embodiment may move the display panel 100 in a horizontal direction and/or a vertical direction by using a double structure including the lower and upper guide frames 210-1 and 210-2, thereby minimizing or preventing light leakage caused by the display panel 100 being pressed. Particularly, since light leakage caused by the display panel 100 being pressed occurs in an LCD apparatus including a liquid crystal layer where liquid crystal molecules are driven by a lateral electric field instead of a vertical electric field, the guide frame 210 according to another embodiment may be applied for supporting a liquid crystal display panel based on an in-plane switching (IPS) mode.

The curved type display apparatus according to another embodiment of the present invention provides the same effects as those of the curved type display apparatus according to an embodiment of the present invention and minimizes or prevents the light leakage caused by the display panel 100 being pressed by using the double structure of guide frame 210.

Figure 12A:
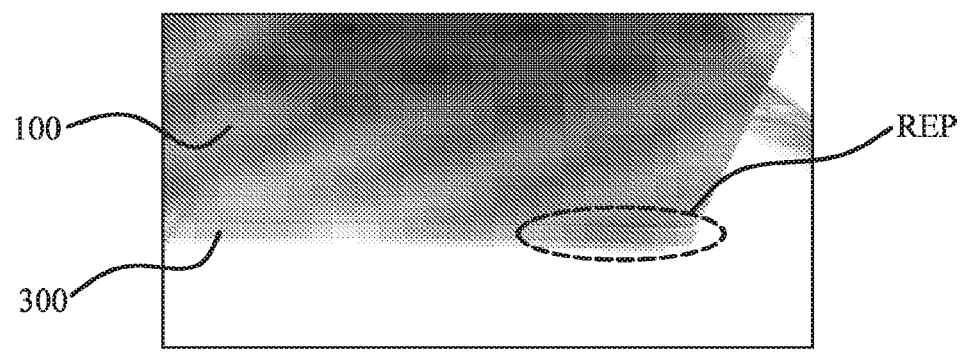
FIG. 12A is a diagram for describing a gap between a display panel and a curved cover according to the first embodiment.
Figure 12B:
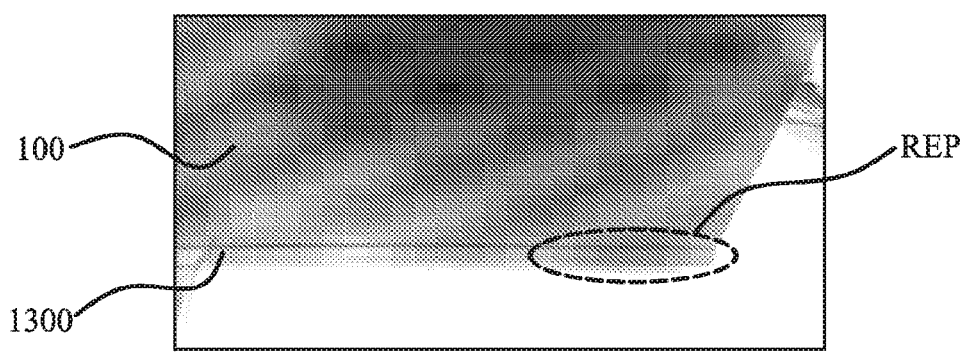
FIG. 12B is a diagram for describing a gap between a display panel and a curved cover according to the second embodiment.

FIG. 12A is a diagram for describing a gap between a display panel and a curved cover according to the first embodiment, and FIG. 12B is a diagram for describing a gap between a display panel and a curved cover according to the second embodiment.

First, referring to FIGS. 12A and 5, it can be seen that the gap GP provided between the display panel 100 and the curved cover 300 according to the first embodiment largely increases at the one edge part LEP and the other edge part LEP of the display panel 100 due to the release of the shape of the display panel 100 and thus becomes non-uniform.

On the other hand, referring to FIGS. 12B and 8, it can be seen that the gap GP provided between the display panel 100 and the curved cover 1300 according to the second embodiment is uniformly maintained by the bending part 314 of the front part 310 which is bent to correspond to modification of a curvature caused by the release of the shape of the display panel 100. That is, it can be seen that the gaps GP in the one edge part LEP and the other edge part LEP of the display panel 100 are uniformly maintained by the bending part 314 provided in the front part 310 of the curved cover 1300.

In addition, a reference interval between the curved cover 300 and the display panel 100 should be maintained for the purpose of preventing the penetration of foreign materials. That is, the reference interval (or a gap) between the front surface of the display panel 100 and the buffering pad attached to the curved cover 300 should be maintained. Therefore, the inventors have manufactured first to fifth samples of a curved type display apparatus which includes the curved cover 300 according to the first embodiment and where the reference interval is set to 0.3 mm. For each of the first to fifth samples, the inventors have inserted a gap gage into between the buffering pad and the right edge part REP of the display panel 100 covered by the curved cover 300 at a position of an arrow B illustrated in FIG. 2, and have measured a size of a gap GP. As a result of the measurement, as shown in the following Table 1, it can be seen that all gaps GP of the first to fifth samples largely exceed the reference interval. As a result, the inventors have confirmed that since an interval between the display panel 100 and the curved cover 300 increases at the right edge part REP of the display panel 100 covered by the curved cover 300 due to the release of the shape of the display panel 100, all the gaps GP of the first to fifth samples of the curved type display apparatus including the curved cover 300 according to the first embodiment largely exceed the reference interval.

TABLE 1

|  | Sample 1 | Sample 2 | Sample 3 | Sample 4 | Sample 5 |
|---|---|---|---|---|---|
| GP [mm] | 0.72 | 0.68 | 0.74 | 0.71 | 0.67 |
| Average [mm] |  |  | 0.704 |  |  |

Moreover, the inventors have manufactured sixth to tenth samples of a curved type display apparatus which includes the curved cover 1300 according to the second embodiment and where the reference interval is set to 0.3 mm. For each of the sixth to tenth samples, the inventors have inserted a gap gage into between the buffering pad and the right edge part REP of the display panel 100 covered by the curved cover 1300 at a position of an arrow C illustrated in FIG. 6, and have measured a size of a gap GP. As a result of the measurement, as shown in the following Table 2, it can be seen that all gaps GP of the sixth to tenth samples are close to the reference interval. As a result, in the sixth to tenth samples of the curved type display apparatus including the curved cover 1300 according to the second embodiment, the inventors have confirmed that the gap GP between the buffering pad and the right edge part REP of the display panel 100 covered by the curved cover 1300 is uniformly maintained by the bending part 314 of the curved part 312 provided in the curved cover 1300 despite the release of the shape of the display panel 100.

TABLE 2

|  | Sample 6 | Sample 7 | Sample 8 | Sample 9 | Sample 10 |
|---|---|---|---|---|---|
| GP [mm] | 0.35 | 0.35 | 0.30 | 0.38 | 0.30 |
| Average [mm] |  |  | 0.336 |  |  |

Figure 13A:
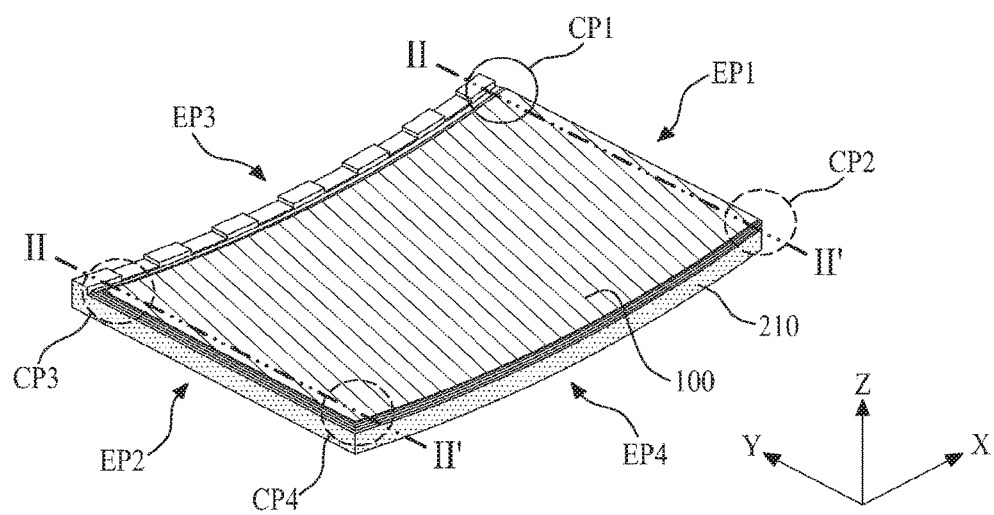
FIG. 13A is diagrams for describing initial shapes of first and second edges of a display panel in the curved type display apparatus according to the first embodiment of the present invention.
Figure 13B:
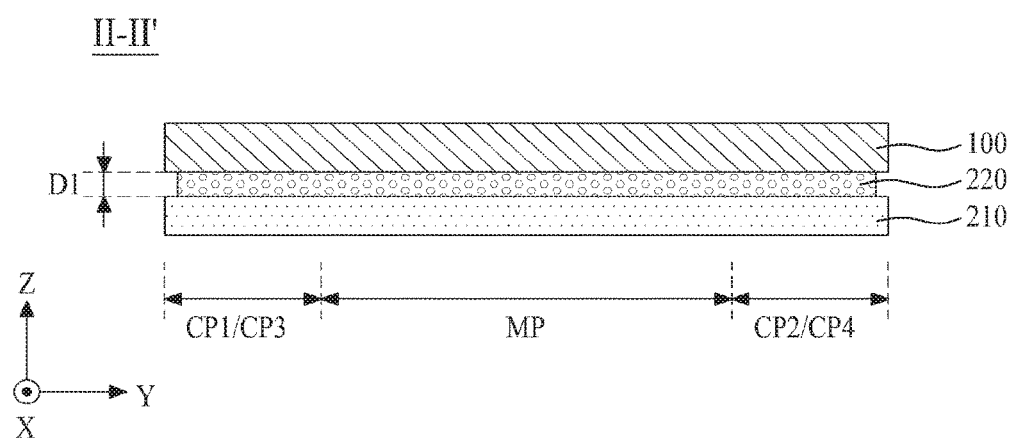
FIG. 13B is a cross-sectional view taken along line II-II' of FIG. 13A.

FIG. 13A is diagrams for describing initial shapes of first and second edges of a display panel in the curved type display apparatus according to the first embodiment of the present invention, and FIG. 13B is a cross-sectional view taken along line II-II' of FIG. 13A.

Referring to FIGS. 13A and 13B, as described above, when the display panel 100 is modified due to the shape-restoring phenomenon, light leakage can occur in the display panel 100 due to a deviation of a stress (hereinafter referred to as a bending stress) caused by physical interference between the display panel 100 and the guide frame 210.

For example, in an initial state of the display panel 100 having a curved shape, since the shape-restoring phenomenon is the minimum, first and second edge parts EP1 and EP2 of the display panel 100 are maintained in a flat state. Therefore, a constant distance D1 between the guide frame 210 and each of corner parts CP1 to CP4 of the display panel 100 is maintained, and thus, the bending stress is not applied to the corner parts CP1 to CP4 of the display panel 100, whereby light leakage does not occur or is minimized.

Figure 14A:
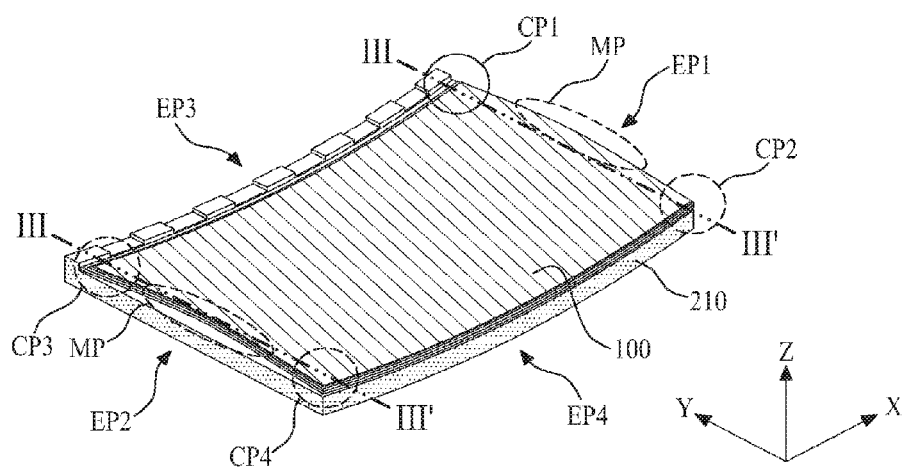
FIG. 14A is diagrams for describing the shape modifications of the first and second edges of the display panel in the curved type display apparatus according to the first embodiment of the present invention.
Figure 14B:
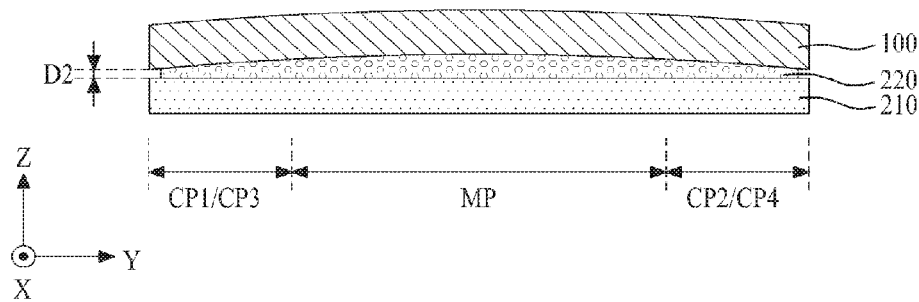
FIG. 14B is a cross-sectional view taken along line III-III' of FIG. 14A.

FIG. 14A is diagrams for describing the shape modifications of the first and second edges of the display panel in the curved type display apparatus according to the first embodiment of the present invention, and FIG. 14B is a cross-sectional view taken along line III-III' of FIG. 14A.

As illustrated in FIGS. 14A and 14B, the shape-restoring phenomenon increases in the curved display panel 100 depending on the elapse of time and an ambient environment condition, and thus, a middle part MP of each of first and second edge parts EP1 and EP2 of the display panel 100 is convexly bent, whereby each of the first and second edge parts EP1 and EP2 of the display panel 100 is modified to a ∩-shape.

Figure 15:
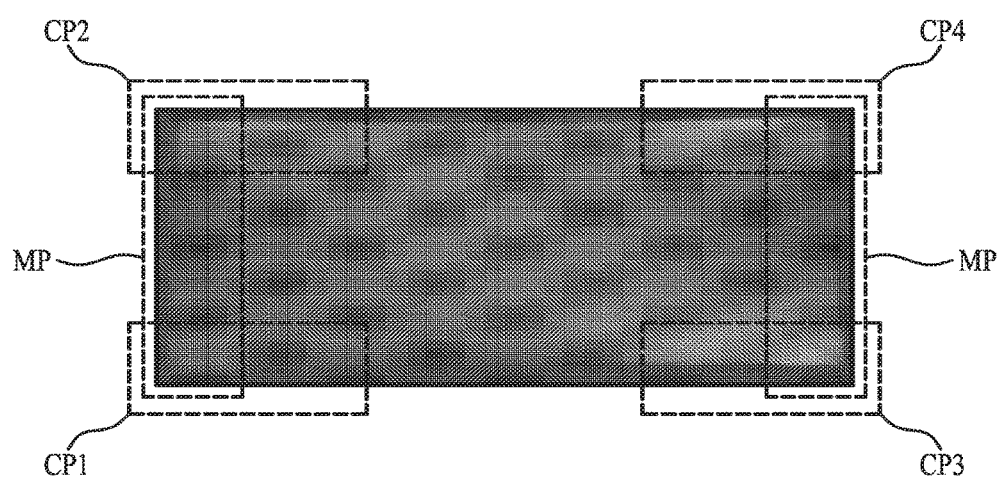
FIG. 15 is a diagram for describing light leakage which occurs in a corner part of the display panel due to restoration of the shape of the display panel in the curved type display apparatus according to the first embodiment of the present invention.

When the middle part MP of each of the first and second edge parts EP1 and EP2 of the display panel 100 is modified to a convex shape, the panel coupling member 220 attached to each of corner parts CP1 to CP4 of the display panel 100 is compressed, and thus, a distance D2 between the guide frame 210 and each of the corner parts CP1 to CP4 of the display panel 100 is reduced. Therefore, the bending stress caused by the modification of the display panel 100 is relatively more concentrated on the corner parts CP1 to CP4 of the display panel 100 than the middle part MP of each of the first and second edge parts EP1 and EP2 of the display panel 100, and for this reason, a rubbing angle of an alignment layer which is provided at each of the corner parts CP1 to CP4 of the display panel 100 is distorted, causing the distortion of the alignment of liquid crystal. That is, the polarizing axis of the upper polarizing member and the rubbing angle of the alignment layer provided on the lower substrate of the display panel 100 are distorted at each of the corner parts CP1 to CP4 of the display panel 100, and for this reason, as illustrated in FIG. 15, light leakage occurs in the corner parts CP1 to CP4 of the display panel 100. Due to the light leakage, the image quality of a black screen is degraded in implementing the black screen in the display panel 100.

Figure 16:
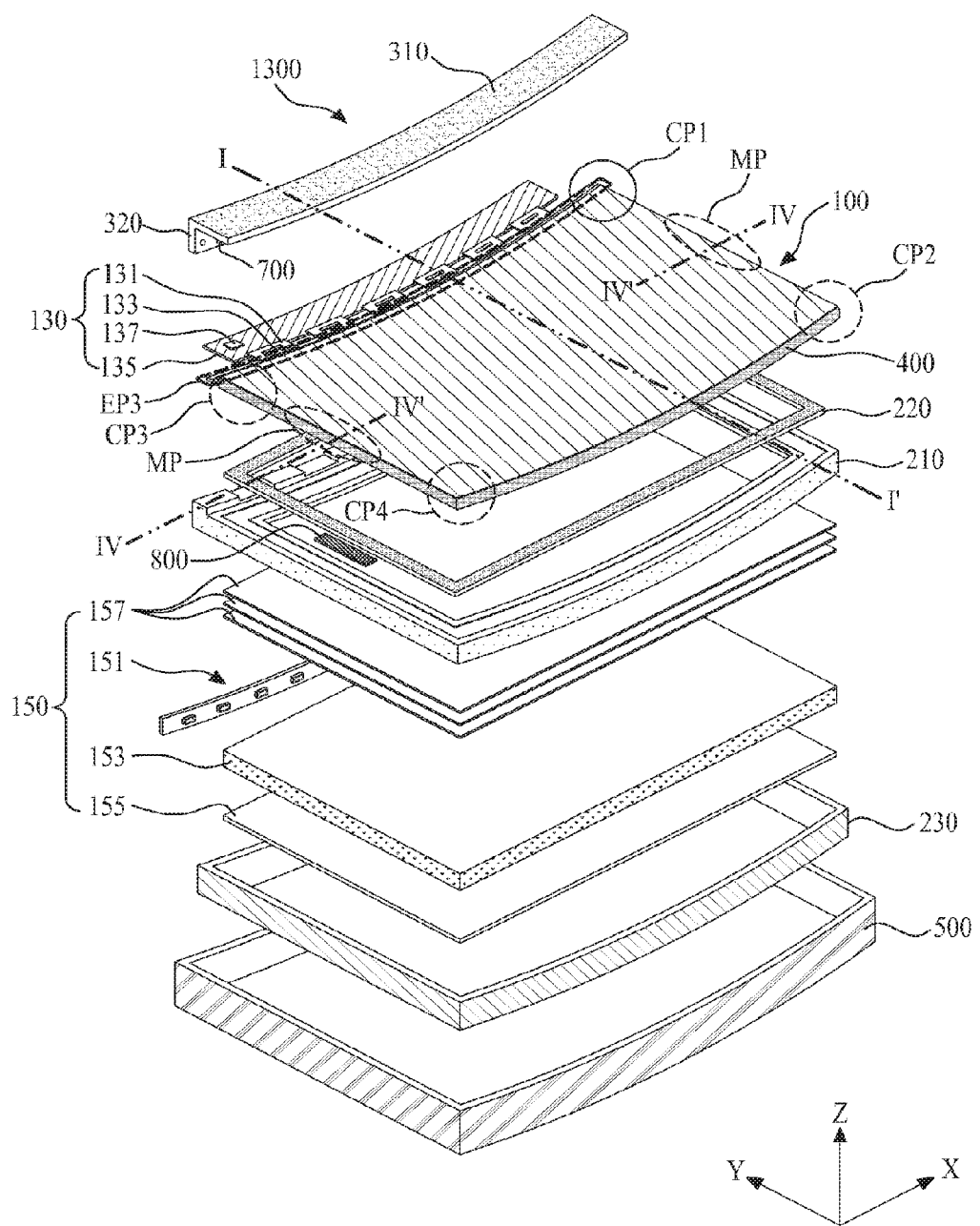
FIG. 16 is a diagram schematically illustrating a curved type display apparatus according to a third embodiment of the present invention.
Figure 17:
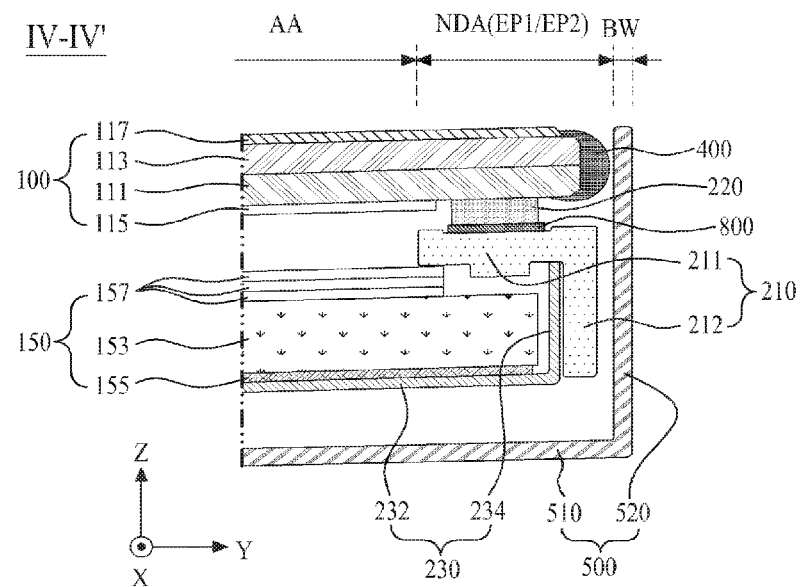
FIG. 17 is a cross-sectional view taken along line IV-IV' of FIG. 16.

FIG. 16 is a diagram schematically illustrating a curved type display apparatus according to a third embodiment of the present invention, and FIG. 17 is a cross-sectional view taken along line IV-IV' of FIG. 16. Here, a cross-sectional surface taken along line I-I' of FIG. 16 is illustrated in FIG. 10 or FIG. 11.

Referring to FIGS. 16 and 17 and 10 or 11, the curved type display apparatus according to the third embodiment of the present invention may include a display panel 100, a panel driving circuit 130, a backlight unit 150, a guide frame 210, a panel coupling member 220, a supporting cover 230, a curved cover 1300, an external case 500, and a supporting pad 800. The curved type display apparatus according to the third embodiment of the present invention may further include the supporting pad 800 in addition to the elements of the curved type display apparatus according to the second embodiment of the present invention illustrated in FIGS. 9 and 10. Hereinafter, therefore, only the supporting pad 800 and elements relevant to the supporting pad 800 will be described, and descriptions on the other elements are not repeated.

The supporting pad 800 may overlap the panel coupling member 220 and support a middle part MP between corner parts CP1/CP3 and CP2/CP4 of the display panel 100. In more detail, the supporting pad 800 may be provided at a middle part MP of each of first and second edge parts EP1 and EP2 of the display panel 100. That is, the supporting pad 800 may support only the middle part MP of each of the first and second edge parts EP1 and EP2 which are convexly modified when restoring the shape of each of the first and second edge parts EP1 and EP2. Therefore, the corner parts CP1 to CP4 of each of first and second edge parts EP1 and EP2 of the display panel 100 may overlap only the panel coupling member 220, and the middle part MP of each of the first and second edge parts EP1 and EP2 may overlap both the supporting pad 800 and the panel coupling member 220. In other words, the supporting pad 800 and the panel coupling member 220 may be disposed in a stacked structure between the guide frame 210 and the middle part MP of each of the first and second edge parts EP1 and EP2, and only the panel coupling member 220 may be disposed in a single-layer structure between the guide frame 210 and each of first to fourth edge parts EP1 to EP4 of the display panel 100 other than the middle part MP.

Since the supporting pad 800 is disposed between the panel coupling member 220 and the guide frame 210, the supporting pad 800 may locally support the panel coupling member 220 overlapping the middle part MP of each of the first and second edge parts EP1 and EP2. Therefore, when restoring the shape of the display panel 100, the supporting pad 800 may increase a distance between the guide frame 210 and the middle part MP of each of the first and second edge parts EP1 and EP2, thereby relaxing a bending stress which is applied to each of the corner parts CP1 to CP4 of the display panel 100 when each of the first and second edge parts EP1 and EP2 is convexly modified. That is, when each of the first and second edge parts EP1 and EP2 is convexly modified, a distance between the guide frame 210 and each of the corner parts CP1 to CP4 of the display panel 100 increases by a thickness of the supporting pad 800, and thus, the bending stress applied to each of the corner parts CP1 to CP4 of the display panel 100 is relaxed, thereby minimizing light leakage which occurs in each of the corner parts CP1 to CP4 of the display panel 100.

The supporting pad 800 may have a young's modulus which is greater than that of the panel coupling member 220. Here, when the supporting pad 800 has a young's modulus which is less than that of the panel coupling member 220, the supporting pad 800 and the panel coupling member 220 may be compressed by a bending force which is applied when each of the first and second edge parts EP1 and EP2 is modified, thereby relaxing the bending stress applied to each of the corner parts CP1 to CP4 of the display panel 100. Therefore, the supporting pad 800 may be formed of a material having a young's modulus which is greater than that of the panel coupling member 220. The supporting pad 800 according to an embodiment may be formed of silicon. The supporting pad 800 according to another embodiment may be formed of a plastic material, for example, at least one of polyethyleneterephthalate (PET), polycarbonate (PC), polyethersulfone (PES), polyethylenapthanate (PEN, and polynorborneen (PNB).

The supporting pad 800 may have a thinner thickness than that of the panel coupling member 220. Here, when the supporting pad 800 has a thicker thickness than that of the panel coupling member 220, an air gap or an air bubble occurs between a side surface of the supporting pad 800 and the panel coupling member 220, and for this reason, an adhesive force of the panel coupling member 220 is reduced, causing an increase in a thickness of the display apparatus.

A length of the supporting pad 800 may be set to 20% to 30% of a length of one side surface of the guide frame 210 that supports each of the first and second edge parts EP1 and EP2, and a length-direction center part of the supporting pad 800 may overlap a center part of each of the first and second edge parts EP1 and EP2. Here, when the length of the supporting pad 800 is less than 20% of the length of the one side surface of the guide frame 210, there is a limitation in relaxing the bending stress applied to each of the corner parts CP1 to CP4 of the display panel 100. In order to overcome such a limitation, a thickness of the supporting pad 800 should increase. Also, when the length of the supporting pad 800 is greater than 30% of the length of the one side surface of the guide frame 210, the bending stress applied to each of the corner parts CP1 to CP4 of the display panel 100 is effectively relaxed, but the panel coupling member 220 can be stripped. In order to solve such stripping, the thickness of the supporting pad 800 should decrease. Considering the relaxation of the bending stress, the stripping, and the thickness, the length of the supporting pad 800 may be set to 20% to 30% of the length of the one side surface of the guide frame 210.

The supporting pad 800 may be provided between the panel coupling member 220 and the guide frame 210 to overlap the panel coupling member 220 and locally overlap only the middle part MP of each of the first and second edge parts EP1 and EP2 of the display panel 100, and thus, when the shape of each of the first and second edge parts EP1 and EP2 is restored, the bending stress applied to each of the corner parts CP1 to CP4 of the display panel 100 is relaxed, thereby minimizing light leakage which occurs in the corner parts CP1 to CP4 of the display panel 100.

Figure 18A:
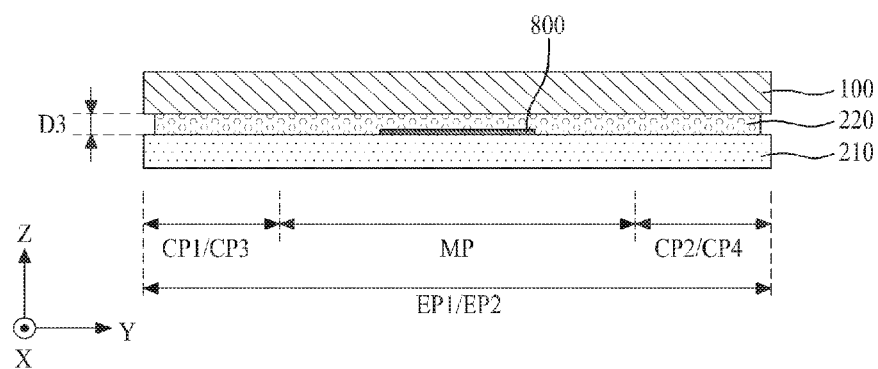
FIG. 18A is a diagram for describing initial shapes of first and second edges of a display panel in the curved type display apparatus according to the third embodiment of the present invention.

For example, as illustrated in FIG. 18A, in an initial state of the display panel 100 having a curved shape, since the shape-restoring phenomenon is the minimum, the first and second edge parts EP1 and EP2 of the display panel 100 are maintained in a flat state. Therefore, a constant distance D3 between the guide frame 210 and each of corner parts CP1 to CP4 of the display panel 100 is maintained, and thus, the bending stress is not applied to the corner parts CP1 to CP4 of the display panel 100, whereby light leakage does not occur or is minimized. In this case, the panel coupling member 220 attached to the middle part MP of each of the first and second edge parts EP1 and EP2 may be compressed by the thickness of the supporting pad 800 due to a young's modulus which is lower than that of the supporting pad 800, and thus, light leakage caused by the supporting pad 800 does not occur in the first and second edge parts EP1 and EP2 of the display panel 100.

Figure 18B:
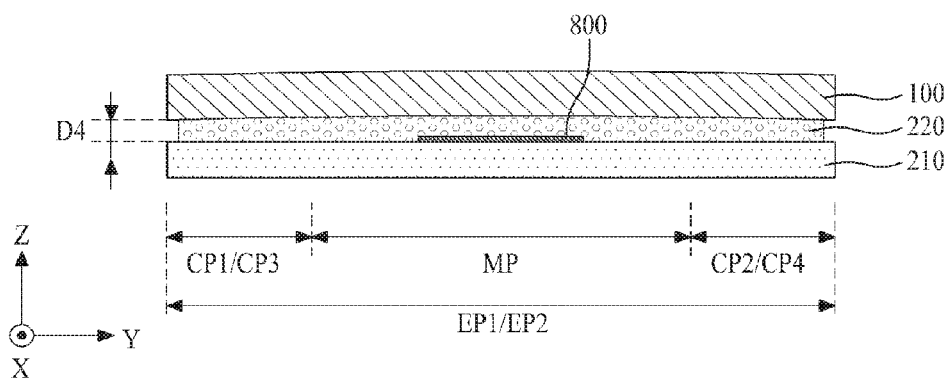
FIG. 18B is a diagram for describing the shape modification of the first and second edges of the display panel in the curved type display apparatus according to the third embodiment of the present invention.

As illustrated in FIG. 18B, the shape-restoring phenomenon increases in the curved display panel 100 depending on the elapse of time and an ambient environment condition, and thus, the middle part MP of each of the first aid second edge parts EP1 and EP2 of the display panel 100 is convexly bent, whereby each of the first and second edge parts EP1 and EP2 of the display panel 100 is modified to a ∩-shape. In this case, the middle part MP of each of the first and second edge parts EP1 and EP2 of the display panel 100 may be modified to a convex shape in a state of being separated from the guide frame 210 by the thickness of the supporting pad 800 by an elastic force of the panel coupling member 220 based on the young's modulus of the supporting pad 800. Therefore, a distance D4 between the guide frame 210 and each of corner parts CP1 to CP4 of the display panel 100 may be reduced due to modification of the shape of each of the first and second edge parts EP1 and EP2 of the display panel 100, but the reduced distance D4 may be compensated for by the supporting pad 800 and the thickness of the supporting pad 800, whereby the bending stress which is relatively concentrated on the corner parts CP1 to CP4 of the display panel 100 is relaxed by the supporting pad 800.

Therefore, when the shape of each of the first and second edge parts EP1 and EP2 is modified, the supporting pad 800 may increase the distance between the guide frame 210 and the middle part MP of each of the first and second edge parts EP1 and EP2 to relax the bending stress applied to the corner parts CP1 to CP4 of the display panel 100, thereby preventing or minimizing light leakage which occurs in the corner parts CP1 to CP4 of the display panel 100.

In the curved type display apparatus according to the third embodiment of the present invention, when the shape of the display panel 100 is modified, the bending stress applied to the corner parts CP1 to CP4 of the display panel 100 is relaxed by the supporting pad 800, thereby preventing or minimizing light leakage which occurs in the corner parts CP1 to CP4 of the display panel 100. Therefore, when a black screen is implemented in the display panel 100, an embodiment of the present invention prevents or minimizes the degradation of the image quality of a black screen caused by the light leakage which occurs in the corner parts CP1 to CP4 of the display panel 100.

The curved type display apparatus according to the third embodiment of the present invention illustrated in FIG. 16 has been described above as including the curved cover 1300 illustrated in FIGS. 6 to 8, but is not limited thereto. For example, the curved type display apparatus according to the third embodiment of the present invention may include the curved cover 300 illustrated in FIG. 4. However, the curved type display apparatus according to the third embodiment of the present invention may include the curved cover 1300 illustrated in FIGS. 6 to 8, for making a gap GP uniform in each of the first and second edge parts EP1 and EP2 (or one edge part LEP and the other edge part REP) of the display panel 100.

Figure 19:
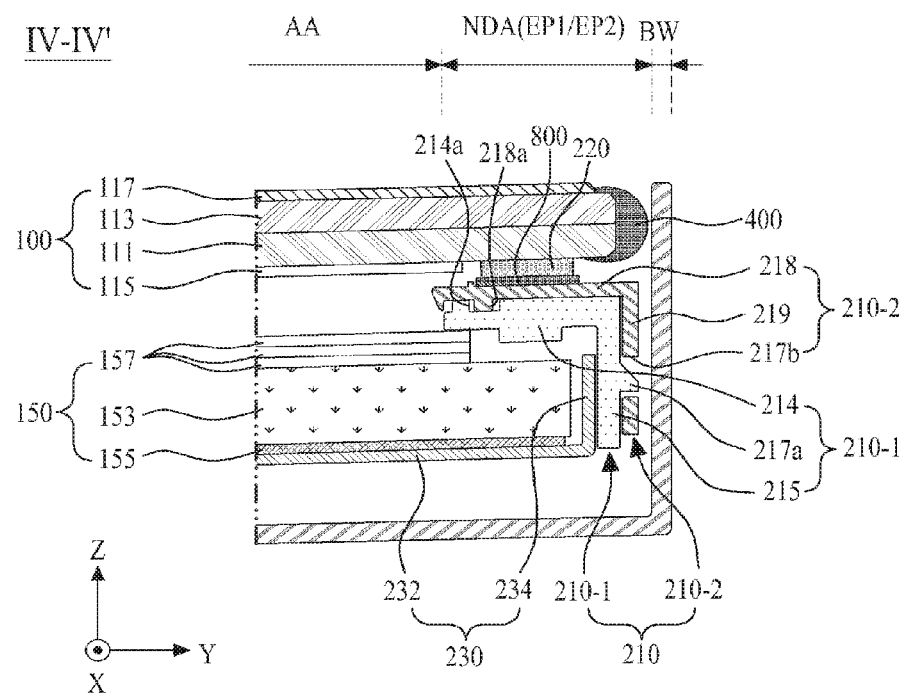
FIG. 19 is another cross-sectional view taken along line IV-IV' of FIG. 16.

FIG. 19 is another cross-sectional view taken along line IV-IV' of FIG. 16, and line I-I' of FIG. 16 is illustrated in FIG. 11. FIG. 19 illustrates a modified structure of the guide frame illustrated in FIG. 16. Hereinafter, therefore, only the guide frame and elements relevant to the guide frame will be described, and descriptions on the other elements are not repeated.

Referring to FIGS. 19, 16 and 11, a guide frame 210 according to another embodiment may include a lower guide frame 210-1 and an upper guide frame 210-2.

The lower guide frame 210-1 may have a tetragonal frame shape and may be accommodated in the supporting cover 230 to support the upper guide frame 210-2. The lower guide frame 210-1 according to an embodiment may include a frame supporting part 214, a lower guide side wall 215, a protrusion side wall 216, and a first coupling member 217a. The lower guide frame 210-1 is the same as the lower guide frame of FIG. 17, and thus, its detailed description is not repeated.

The upper guide frame 210-2 may have a flatly tetragonal belt shape and may be disposed on the lower guide frame 210-1 to support the display panel 100. The upper guide frame 210-2 according to an embodiment may include a panel attaching part 218, an upper guide side wall 219, and a second coupling member 217b. The upper guide frame 210-2 is the same as the upper guide frame of FIG. 11, and thus, its detailed description is not repeated.

In addition, in a state where a position of the upper guide frame 210-2 coupled to the display panel 100 by the panel coupling member 220 is fixed, when heat expansion occurs in the display panel 100 and/or the guide frame 210, light leakage can occur due to a change in the liquid crystal layer caused by modification of the display panel 100. It can be considered that the light leakage occurs because of maintaining a state where the display panel 100 is tightly fixed not to be moved. Therefore, the upper guide frame 210-2 may be disposed in the frame supporting part 214 of the lower guide frame 210-1 to be moved in a horizontal direction (X, Y) within a predetermined range. To this end, the guide frame 210 according to another embodiment may further include first and second movement guiders 214a and 218a.

The first movement guider 214a may be provided in the frame supporting part 214 of the lower guide frame 210-1. The first movement guider 214a according to an embodiment may be at least one guide groove which is provided to have a certain depth on a top of the frame supporting part 214.

The second movement guider 218a may be provided in the panel coupling part 218 of the upper guide frame 210-2 and may be movably disposed at the first movement guider 214a. The second movement guider 218a according to an embodiment may be at least one guide rail that is provided to have a certain height from a bottom of the panel coupling part 218.

The guide frame 210 according to another embodiment may move the display panel 100 in a horizontal direction and/or a vertical direction by using a double structure, including the lower and upper guide frames 210-1 and 210-2, thereby minimizing or preventing light leakage caused by the display panel 100 being pressed. Particularly, since fight leakage caused by the display panel 100 being pressed occurs in an LCD apparatus including a liquid crystal layer where liquid crystal molecules are driven by a lateral electric field instead of a vertical electric field, the guide frame 210 according to another embodiment may be applied for supporting a liquid crystal display panel based on the IPS mode.

In addition, the supporting pad 800 may be provided between the upper guide frame 210-2 and the panel coupling member 220 overlapping the middle part MP of each of the first and second edge parts EP1 and EP2 of the display panel 100. As described above, when the shape of each of the first and second edge parts EP1 and EP2 is modified, the supporting pad 800 may increase the distance between the guide frame 210 and the middle part MP of each of the first and second edge parts EP1 and EP2 to relax the bending stress applied to the corner parts CP1 to CP4 of the display panel 100, thereby preventing or minimizing light leakage which occurs in the corner parts CP1 to CP4 of the display panel 100.

Figure 20:
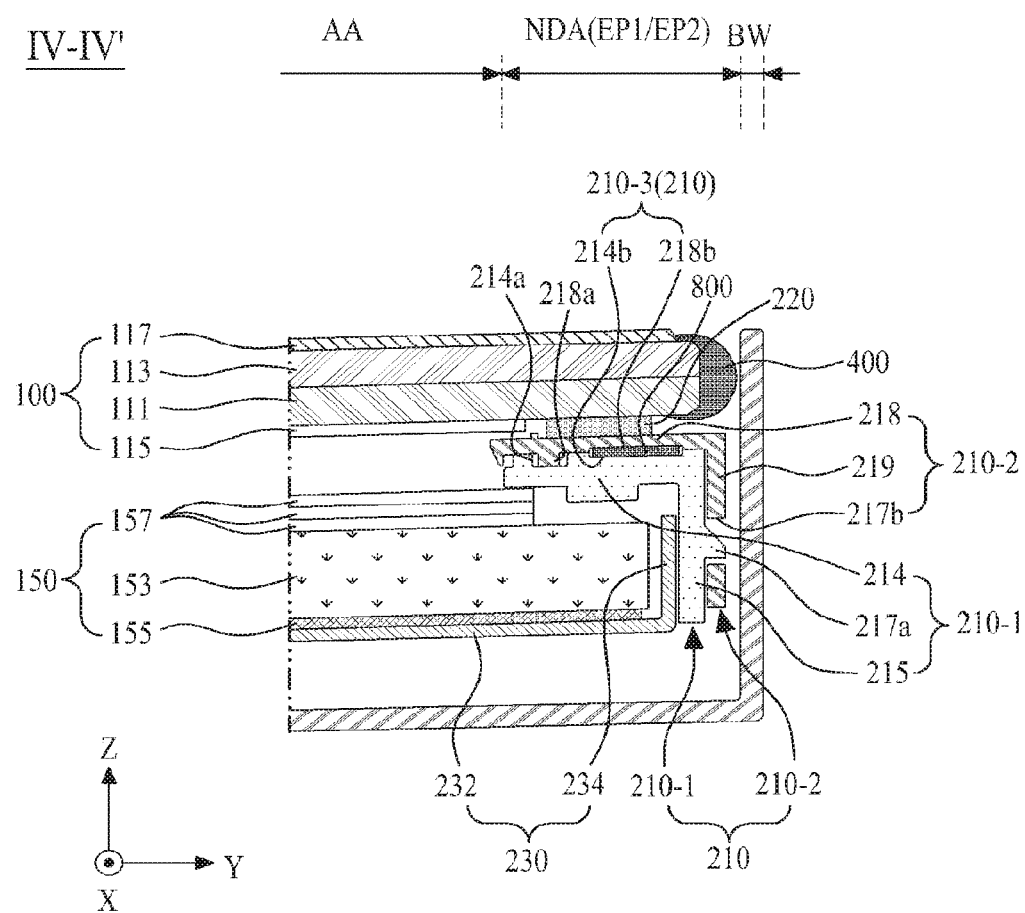
FIG. 20 is another cross-sectional view taken along line IV-IV' of FIG. 16.

FIG. 20 is another cross-sectional view taken along line IV-IV' of FIG. 16. FIG. 20 illustrates an arrangement structure of the supporting pad illustrated in FIG. 16, and in more detail, illustrates the changing of an arrangement position of the supporting pad illustrated in FIG. 19. Hereinafter, therefore, only elements relevant to the arrangement structure of the supporting pad will be described, and descriptions on the other elements are not repeated.

The supporting pad 800 may be disposed between the lower guide frame 210-1 and the upper guide frame 210-2. In more detail, the supporting pad 800 may be disposed between the panel attaching part 218 of the upper guide frame 210-2 and the frame supporting part 214 of the lower guide frame 210-1. To this end, the guide frame 210 according to another embodiment of the present invention may further include a pad disposing part 210-3 that accommodates the supporting pad 800.

The pad disposing part 210-3 may include a first groove 214b and a second groove 218b.

The first groove 214b may be provided in the frame supporting part 214 of the lower guide frame 210-1 and may be disposed to be concave from a top of the frame supporting part 214 and to have a depth which is less than a height of the supporting pad 800. The first groove 214b may support a bottom of the supporting pad 800 and guide an arrangement position of the supporting pad 800, but since the first groove 214b is not an essential element, the first groove 214b may be omitted.

The second groove 218b may be provided in the panel attaching part 218 of the upper guide frame 210-2 to directly face the first groove 214b and may be disposed to be concave from a bottom of the panel attaching part 218. The second groove 218b may cover an upper portion of the supporting pad. 800 protruding from the first groove 214b.

The supporting pad 800 may be disposed in a pad accommodating space provided by the first and second grooves 214b and 218b. A bottom of the supporting pad 800 may be attached to the frame supporting part 214 of the lower guide frame 150-1, and a top of the supporting pad 800 may be attached to a ceiling of the second groove 218b. As described above, when the shape of each of the first and second edge parts EP1 and EP2 is modified, the supporting pad 800 may increase the distance between the guide frame 210 and the middle part MP of each of the first and second edge parts EP1 and EP2 to relax the bending stress applied to the corner parts CP1 to CP1 of the display panel 100, thereby preventing or minimizing light leakage which occurs in the corner parts CP1 to CP4 of the display panel 100. Also, the supporting pad 800 is disposed between the upper guide frame 150-2 and the lower guide frame 150-1, and thus, when the shape of each of the first and second edge parts EP1 and EP2 is modified, the bending stress applied to the corner parts CP1 to CP4 of the display panel 100 is relaxed without any reduction in a coupling force between the display panel 100 and the guide frame 210 through the panel coupling member 220.

In the curved type display apparatus according to the above-described embodiments of the present invention, the display panel 100 has been described above as a liquid crystal panel including the liquid crystal layer, but is not limited thereto. For example, the display panel 100 may use an organic light emitting display panel or a plasma display panel, and in this case, the backlight unit 150 and the supporting cover 230 may be omitted.

The curved type display apparatus according to the embodiments of the present invention may be applied to a small and medium display apparatus, such as a monitor of a computer and/or the like, and a large display apparatus having a large screen such as a large-screen television and/or the like.

As described above, according to the embodiments of the present invention, edges other than one edge of the display panel are exposed to the outside without being covered by instruments such as the panel supporting part and an external case, and thus, the bezel width of the curved type display apparatus is reduced. Also, a front aesthetic appearance of the curved type display apparatus is enhanced by removing a stepped portion from an edge of the display panel.

Moreover, according to the embodiments of the present invention, an aesthetic appearance of the curved type display apparatus is enhanced by minimizing or preventing non-uniformity of a gap which occurs between the display panel and the curved cover because the shape of the display panel having a curved shape is released.

Moreover, according to the embodiments of the present invention, by relaxing an interference stress which is applied to a corner part of the display panel when the shape of the display panel having a curved shape is released, the image quality of a black screen is prevented from being degraded due to light leakage that occurs in the corner part of the display panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A curved type display apparatus comprising:
a display panel having a curved shape;
a guide frame configured to support a rear edge of the display panel;
a panel coupling member configured to couple the rear edge of the display panel to the guide frame;
a supporting pad between the guide frame and the panel coupling member, the supporting pad configured to support a middle part between corners of the display panel, wherein the supporting pad overlaps both the guide frame and the panel coupling member at the middle part, but does not overlap either the guide frame or the panel coupling member at the corners of the display panel; an external case configured to accommodate the guide frame and surround side surfaces of the guide frame and the display panel;
wherein the display panel comprises first and second edge parts disposed in parallel to cover the supporting pad,
a corner of each of the first and second edge parts overlaps the panel coupling member, and a middle part of each of the first and second edge parts overlaps the panel coupling member and the supporting pad;
a panel driving circuit coupled to a third edge part of the display panel; and
a curved cover configured to cover the third edge part and the panel driving circuit,
wherein the curved cover comprises:
a front part configured to cover an upper portion of the third edge part, the front part having a curved shape which corresponds to a shape of the display panel; and
a side wall part bent from the front part to be coupled to one side of the guide frame, and covered by the external case,
wherein the front part comprises:
a middle part having a curved shape having a first curvature;
one edge having a curved shape having a second curvature different from the first curvature; and
another edge having a curved shape having the second curvature.

2. The curved type display apparatus of claim 1, wherein the guide frame comprises: a panel coupling part coupled to a rear edge of the display panel through the panel coupling member; and a guide side wall vertically coupled to the panel coupling part and covered by the external case, and wherein the supporting pad is disposed between the panel coupling member and the panel coupling part.

3. The curved type display apparatus of claim 1, wherein the guide frame comprises: an upper guide frame coupled to a rear edge of the display panel through the panel coupling member; and a lower guide frame configured to support the upper guide frame, and wherein the supporting pad is disposed between the panel coupling member and the upper guide frame.

4. The curved type display apparatus of claim 1, wherein the guide frame comprises: an upper guide frame coupled to a rear edge of the display panel through the panel coupling member; and a lower guide frame configured to support the upper guide frame, and wherein the supporting pad is disposed between the upper guide frame and the rear edge of the display panel.

5. The curved type display apparatus of claim 1, wherein the supporting pad has a young's modulus which is greater than a young's modulus of the panel coupling member.

6. The curved type display apparatus of claim 1, wherein a length of the supporting pad is 20% to 30% of a length of one side surface of the guide frame supporting each of the first and second edge parts, and a length-direction center part of the supporting pad overlaps a center part of each of the first and second edge parts.

7. The curved type display apparatus of claim 1, wherein a corner of each of the one edge and the other edge of the front part is bent toward the display panel to have the second curvature which is larger than the first curvature.

8. The curved cover of claim 1, wherein a corner of each of the one edge and the other edge of the front part is bent toward the display panel to have a triangular shape.

9. The curved cover of claim 1, wherein a corner of each of the one edge and the other edge of the front part is stepped by a length from a front surface of the front part.

10. The curved cover of claim 9, wherein the length is set to a thickness of the front part.

11. The curved cover of claim 9, wherein the length is set to a distance between the display panel and the front part.

* * * * *